(12) United States Patent
Haag et al.

(10) Patent No.: US 12,117,636 B2
(45) Date of Patent: Oct. 15, 2024

(54) OPTICAL FILM AND GLASS LAMINATE

(71) Applicant: 3M INNOVATIVE PROPERTIES COMPANY, St. Paul, MN (US)

(72) Inventors: Adam D. Haag, Woodbury, MN (US); Brianna N. Wheeler, Bloomington, MN (US); Matthew B. Johnson, Woodbury, MN (US); William F. Edmonds, Chavannes-des-Bois (CH)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 397 days.

(21) Appl. No.: 17/439,011

(22) PCT Filed: Apr. 1, 2020

(86) PCT No.: PCT/IB2020/053105
§ 371 (c)(1),
(2) Date: Sep. 14, 2021

(87) PCT Pub. No.: WO2020/202033
PCT Pub. Date: Oct. 8, 2020

(65) Prior Publication Data
US 2022/0146728 A1    May 12, 2022

Related U.S. Application Data

(60) Provisional application No. 62/828,632, filed on Apr. 3, 2019.

(51) Int. Cl.
*G02B 5/30* (2006.01)
(52) U.S. Cl.
CPC ........... *G02B 5/305* (2013.01); *G02B 5/3066* (2013.01); *G02B 5/3083* (2013.01)

(58) Field of Classification Search
CPC .............................. G02B 5/305; G02B 5/3066
See application file for complete search history.

(56) References Cited

U.S. PATENT DOCUMENTS

| | | | |
|---|---|---|---|
| 2,526,327 | A | 10/1950 | Carlson |
| 3,610,729 | A | 10/1971 | Rogers |

(Continued)

FOREIGN PATENT DOCUMENTS

| | | |
|---|---|---|
| CN | 106630688 A | 5/2017 |
| EP | 2826621 | 1/2015 |

(Continued)

OTHER PUBLICATIONS

3M™ Ultra-Clear Solar Film, 3M Renewable Energy Division, 2015, 2 pages.

(Continued)

*Primary Examiner* — Christopher Stanford
(74) *Attorney, Agent, or Firm* — Clifton F. Richardson

(57) ABSTRACT

An optical film includes a plurality of alternating first and second layers. The first layers have a first in-plane birefringence, the second layers have a second in-plane birefringence, and the second in-plane birefringence is less than the first in-plane birefringence and greater than 0.03. The first layers may include polyethylene terephthalate homopolymer and the second layers may include glycol-modified co(polyethylene terephthalate). The optical film has a shrinkage along a first direction of greater than 4% and a shrinkage along an orthogonal second direction of greater than 3% when heated at 150° C. for 15 minutes. A glass laminate is prepared by disposing the optical film between glass layers and laminating the optical film to the glass layers.

7 Claims, 16 Drawing Sheets

(56) References Cited

U.S. PATENT DOCUMENTS

| | | |
|---|---|---|
| 4,277,672 A | 7/1981 | Jones |
| 4,446,305 A | 5/1984 | Rogers |
| 4,540,623 A | 9/1985 | Im |
| 4,730,097 A | 3/1988 | Campbell |
| 4,894,513 A | 1/1990 | Koontz |
| 5,103,337 A | 4/1992 | Schrenk |
| 5,360,659 A | 11/1994 | Arends |
| 5,434,384 A | 7/1995 | Koontz |
| 5,448,404 A | 9/1995 | Schrenk |
| 5,592,188 A | 1/1997 | Doherty |
| 5,882,774 A | 3/1999 | Jonza |
| 6,045,894 A * | 4/2000 | Jonza ............... B42D 25/29 428/141 |
| 6,157,490 A | 12/2000 | Wheatley |
| 6,180,921 B1 | 1/2001 | Boaz |
| 6,368,699 B1 | 4/2002 | Gilbert |
| 6,531,230 B1 | 3/2003 | Weber |
| 6,783,349 B2 | 8/2004 | Neavin |
| 6,797,396 B1 | 9/2004 | Liu |
| 6,827,886 B2 | 12/2004 | Neavin |
| 6,952,312 B2 | 10/2005 | Weber |
| 7,123,418 B2 | 10/2006 | Weber |
| 7,864,431 B2 | 1/2011 | Martin |
| 8,094,247 B2 | 1/2012 | Allemand |
| 8,748,749 B2 | 6/2014 | Srinivas |
| 8,921,739 B2 | 12/2014 | Petrenko |
| 8,932,701 B2 | 1/2015 | Kranz |
| 9,715,110 B1 | 7/2017 | Brown |
| 9,823,395 B2 | 11/2017 | Weber |
| 2003/0016334 A1 | 1/2003 | Weber |
| 2003/0198807 A1 | 10/2003 | Banba |
| 2004/0125291 A1 | 7/2004 | Kawahara |
| 2005/0002097 A1 | 1/2005 | Boyd |
| 2005/0270655 A1 | 12/2005 | Weber |
| 2006/0072057 A1 | 4/2006 | Yano |
| 2006/0099411 A1 | 5/2006 | Xia |
| 2007/0279755 A1 | 12/2007 | Hitschmann |
| 2007/0298271 A1 | 12/2007 | Liu |
| 2008/0203078 A1 | 8/2008 | Huerter |
| 2010/0177383 A1 | 7/2010 | Kamada |
| 2010/0272971 A1 | 10/2010 | Miyai |
| 2011/0215078 A1 | 9/2011 | Williams |
| 2011/0217451 A1 | 9/2011 | Veerasamy |
| 2011/0297661 A1 | 12/2011 | Raghavan |
| 2012/0243104 A1 | 9/2012 | Chen |
| 2013/0248118 A1 | 9/2013 | Inui |
| 2015/0064428 A1 | 3/2015 | Matsuo |
| 2015/0160529 A1 | 6/2015 | Popovich |
| 2015/0275016 A1 | 10/2015 | Bao |
| 2015/0277172 A1 | 10/2015 | Sekine |
| 2016/0301106 A1 | 10/2016 | Schmidt |
| 2017/0313032 A1 | 11/2017 | Arndt |
| 2018/0014359 A1 | 1/2018 | Simonato |
| 2018/0074340 A1 | 3/2018 | Robbins |
| 2018/0284440 A1 | 10/2018 | Popovich |

FOREIGN PATENT DOCUMENTS

| | | | |
|---|---|---|---|
| EP | 3206058 | | 8/2017 |
| JP | 2004046065 A | | 2/2004 |
| JP | 2006215174 A | | 8/2006 |
| JP | 2012214026 A | * | 11/2012 |
| JP | 2017206012 | | 11/2017 |
| JP | 2017206012 A | * | 11/2017 |
| JP | 2022500689 A | | 1/2022 |
| WO | WO 1995-17303 | | 6/1995 |
| WO | WO 1999-39224 | | 8/1999 |
| WO | 2009076284 A1 | | 6/2009 |
| WO | 2010059416 A1 | | 5/2010 |
| WO | 2012005879 A1 | | 1/2012 |
| WO | WO 2017-205106 | | 11/2017 |
| WO | WO-2017205106 A1 * | 11/2017 | ............ G02B 27/28 |
| WO | WO 2017-223023 | | 12/2017 |
| WO | WO-2017223023 A1 * | 12/2017 | ............ B32B 17/00 |
| WO | WO 2019-145860 | | 8/2019 |
| WO | WO 2020-016703 | | 1/2020 |
| WO | WO 2020-068513 | | 4/2020 |
| WO | WO 2020-100056 | | 5/2020 |

OTHER PUBLICATIONS

Weber, "Giant Birefringent Optics in Multilayer Polymer Mirrors", Science, Mar. 2000, vol. 287, pp. 2451-2457.

International Search Report for PCT International Application No. PCT/IB2020/053105, mailed on Jun. 30, 2020, 3 pages.

* cited by examiner

OPTICAL FILM AND GLASS LAMINATE

CROSS REFERENCE TO RELATED APPLICATIONS

This application is a national stage filing under 35 U.S.C. 371 of PCT/IB2020/053105, filed Apr. 1, 2020, which claims the benefit of Provisional Application No. 62/828,632, filed Apr. 3, 2019, the disclosures of which are incorporated by reference in their entirety herein.

BACKGROUND

An optical film may include alternating polymer layers. For example, a multilayer reflective polarizer may be formed of alternating polymer layers, oriented such that the difference in refractive indices between the alternating polymer layers cause light of one orthogonal polarization to be substantially reflected, while the other is substantially transmitted. Through layer stack design and material selection, the multilayer reflective polarizer can polarize light over a desired range of visible and infrared wavelengths.

SUMMARY

In some aspects of the present description, an optical film including a plurality of alternating first and second layers is provided. The first layers have a first in-plane birefringence being a difference in refractive index of the first layers along a first in-plane direction and a refractive index of the first layers along an orthogonal second in-plane direction. The second layers have a second in-plane birefringence being a difference in refractive index of the second layers along the first in-plane direction and a refractive index of the second layers along the second in-plane direction. The second in-plane birefringence is less than the first in-plane birefringence and greater than 0.03. The optical film has a shrinkage along the first in-plane direction of greater than 4% and a shrinkage along the second in-plane direction of greater than 3% when heated at 150° C. for 15 minutes.

In some aspects of the present description, a reflective polarizer including a plurality of alternating first and second layers is provided. The first layers include polyethylene terephthalate homopolymer and the second layers includes glycol-modified co(polyethylene terephthalate). The reflective polarizer has a shrinkage along a block axis of the reflective polarizer of greater than 4% and a shrinkage along an orthogonal pass axis of the reflective polarizer of greater than 3% when heated at 150° C. for 15 minutes.

In some aspects of the present description, a reflective polarizer including a plurality of alternating first polymer layers and second polymer layers is provided. Each layer of the alternating first and second polymer layers has an in-plane birefringence of at least 0.03, the in-plane birefringence being a difference in refractive index of the layer along a first in-plane direction and a refractive index of the layer along an orthogonal second in-plane direction. A difference $\Delta n1$ in refractive index between the first and second polymer layers along the first in-plane direction is at least 0.03. A difference $\Delta n2$ in refractive index between the first and second polymer layers along the second in-plane direction has an absolute value $|\Delta n2|$ less than $\Delta n1$. The reflective polarizer has a shrinkage along the first in-plane direction of greater than 4% and a shrinkage along the second in-plane direction of greater than 3% when heated at 150° C. for 15 minutes.

In some aspects of the present description, a method of making a glass laminate is provided. The method includes providing first and second glass layers; disposing a reflective polarizer between the first and second glass layers; disposing first and second adhesive layers between the reflective polarizer and the respective first and second glass layers; and laminating the reflective polarizer to the first and second glass layers at a temperature of at least 120° C. and a pressure of at least 0.9 MPa to provide the glass laminate. The reflective polarizer includes a plurality of alternating polymeric interference layers reflecting and transmitting light primarily by optical interference. Prior to the laminating step, the reflective polarizer has a shrinkage along a block axis of the reflective polarizer of greater than 4% and a shrinkage along an orthogonal pass axis of the reflective polarizer of greater than 3% when heated at 150° C. for 15 minutes.

In some aspects of the present description, a glass laminate including a first glass layer and a reflective polarizer laminated to the first layer is provided. The reflective polarizer includes a plurality alternating polymeric interference layers reflecting and transmitting light primarily by optical interference and defining a block axis and an orthogonal pass axis. The reflective polarizer has a tensile stress of at least 0.5 MPa along the block axis and a tensile stress of at least 0.5 MPa along the pass axis.

In some aspects of the present description, a glass laminate including first and second glass layers, and a reflective film disposed substantially symmetrically between and adhered to the first and second glass layers is provided. The reflective film includes a plurality of alternating polymeric interference layers. When a plurality of parallel straight lines is projected onto the glass laminate along a first direction making an angle θ in a range of 40 degrees to 75 degrees with respect to a normal to the glass laminate so that the plurality of parallel straight lines extend along a second direction orthogonal to a plane of incidence defined by the first direction and the normal, each projected straight line reflects from the reflective film as a reflected line, each reflected line having a luminance distribution defining a centerline of the reflected line, a distribution of an angle α between the centerlines of the reflected lines and the second direction having a standard deviation of less than 2.5 degrees.

In some aspects of the present description, a glass laminate including first and second glass layers and a reflective film disposed between and bonded to the first and second glass layers is provided. The reflective film includes a plurality of alternating polymeric interference layers. When a plurality of parallel straight lines is projected from a display surface onto the glass laminate along a first direction, each straight line having a substantially same line width on the display surface, the first direction making an angle θ in a range of 40 degrees to 75 degrees with respect to a normal to the glass laminate, the plurality of parallel straight lines extending along a second direction orthogonal to a plane of incidence defined by the first direction and the normal, each projected straight line reflects from the reflective film as a reflected line such that an image of the reflected line has a luminance distribution in an image plane, a magnification from the display surface to the image plane being about 1, the luminance distribution of the image of each reflected line having a standard deviation about a best fit straight line, a mean of the standard deviations being less than 0.9 times the line width.

In some aspects of the present description, a system including a glass laminate and a projector disposed to project a display image onto the glass laminate is provided. The glass laminate includes first and second glass layers and an optical stack disposed between the first and second glass layers and including a reflective polarizer and at least one of a heating element or a heat spreading layer disposed on the reflective polarizer. The system further includes a thermal control system adapted to heat the glass laminate by supplying energy to the at least one of the heating element or the heat spreading layer. The reflective polarizer may be any reflective polarizer of the present description.

In some aspects of the present description, an optical stack including a reflective polarizer and at least one of a substantially transparent resistive heating element or a substantially transparent heat spreading layer having a thermal conductivity of at least 1.5 W/(m·K) disposed on the reflective polarizer is provided. The reflective polarizer may be any reflective polarizer of the present description.

In some aspects of the present description, an optical stack including a reflective polarizer and a substantially transparent heat spreading layer disposed on the reflective polarizer is provided. The reflective polarizer includes a plurality of alternating first and second layers and the heat spreading layer has a thermal conductivity greater than a largest thermal conductivity of the first and second layers. The reflective polarizer may be any reflective polarizer of the present description.

DETAILED DESCRIPTION

Figure 1A:
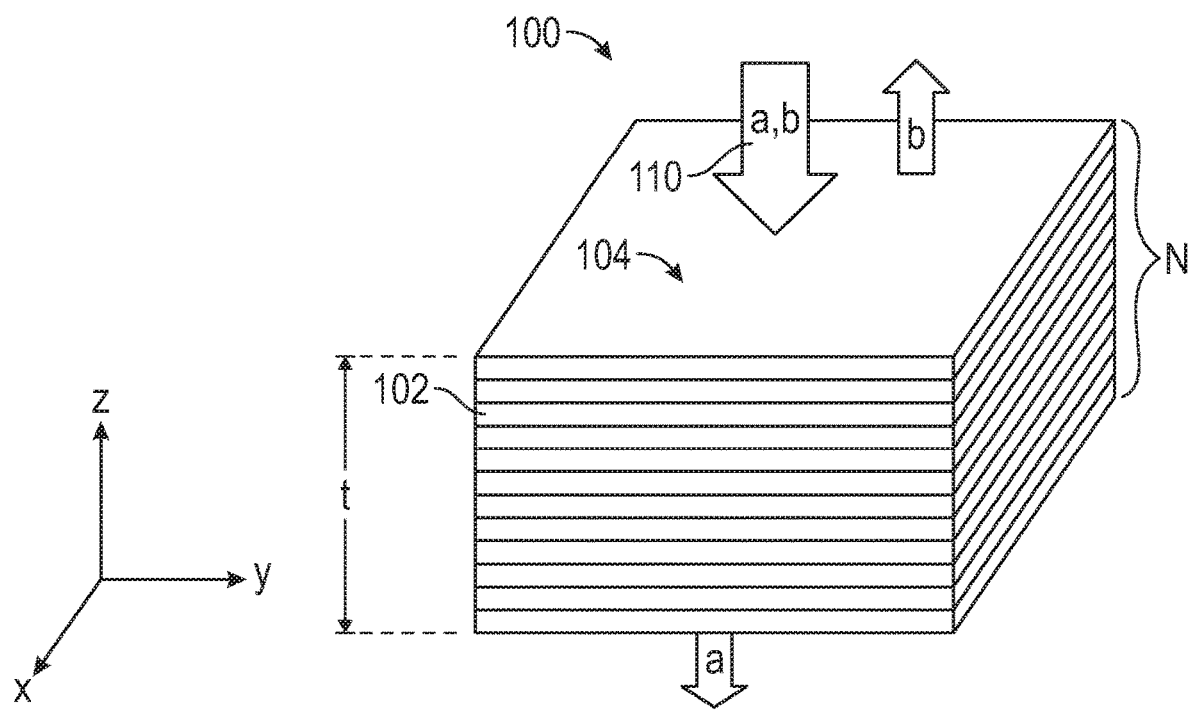
FIG. 1A is a schematic perspective view of an optical film.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Multilayer optical films that provide desirable transmission and/or reflection properties at least partially by an arrangement of microlayers of differing refractive index, are known. Such optical films have been demonstrated by coextrusion of alternating polymer layers, for example. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods.

In automotive applications, a multilayer optical film may be laminated between glass layers using polyvinyl butyral (PVB) adhesive layers under heat and pressure. The lamination process can result in a reduced flatness of the optical film and this can result in a waviness or wrinkling that is visible when an image projected onto the glass laminate is viewed. According to the present description, it has been found that optical films laminated to a glass layer or between two glass layers can result in a substantially reduced waviness when the optical film has a high shrinkage under heat. For example, the optical film may have a shrinkage along a first direction of greater than 4%, or greater than 5%, or greater than 6%, or greater than 7%, or greater than 8% when heated at 150° C. for 15 minutes. The optical film may also have a shrinkage along a second direction orthogonal to the first direction of greater than 3%, or greater than 3.5%, or greater than 4%, or greater than 5%, or greater than 6%, or greater than 7%, or greater than 8% when heated at 150° C. for 15 minutes. The optical film may have a shrinkage of less than 20% along each of the first and second directions when heated at 150° C. for 15 minutes. The first and second directions can be understood to be directions in a plane of the optical film when the optical film is laid flat or directions in a tangent plane at a location on a curved optical film. In some embodiments, the alternating layers have an in-plane birefringence being a difference in refractive index along a first in-plane direction (e.g., an orientation direction of the layer) and along an orthogonal second in-plane direction, and the first and second directions along which the shrinkage is specified correspond to the first and second in-plane directions along which the in-plane birefringence is defined. In some embodiments, the first direction is a first in-plane direction along a block axis of a reflective polarizer (polarization axis along which the reflective polarizer has a highest reflectivity) and the second direction is a second in-plane direction along a pass axis of the reflective polarizer (polarization axis along which the reflective polarizer has a lowest reflectivity). In some embodiments, the block and pass axes of the reflective polarizer are defined by the alternating layers of the reflective polarizer as follows: the block axis is the axis along which the refractive index difference between adjacent layers is the largest, and the pass axis is along the orthogonal in-plane direction. Methods of making multilayer optical films having a high shrinkage are described further elsewhere herein and in PCT Publ. No. WO 2017/205106 (Stover et al.) and corresponding U.S. patent application Ser. No. 16/301,106 (Stover et al.).

It has also been found that an optical film (e.g., a reflective polarizer) with both high index layers and low index layers that have some degree of crystallinity developed during stretching due to the low stretching temperature of polyethylene terephthalate, for example, are especially suited for automotive applications, for example. Moreover, it has been found that optical films such as multilayer reflective polarizers in which both the high index layers and the low index layers develop asymmetric index of refraction through stretching can be useful in automotive or other applications. For example, such films have been found to exhibit better inhibition of haze after exposure to heat (e.g., in an automobile exposed to sunlight).

Figure 1B:
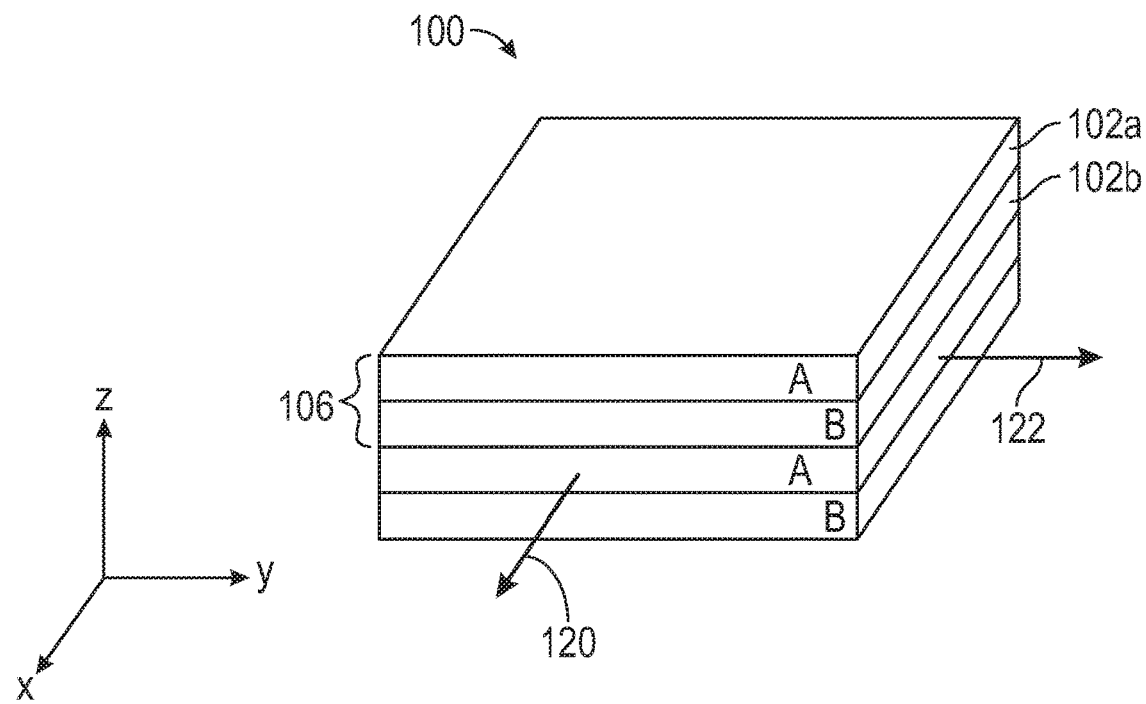
FIG. 1B is a schematic perspective view of a segment of the optical film of FIG. 1A.

FIG. 1A is a schematic perspective view of an optical film 100 which may be a reflective polarizer, and which may be used in any of the glass laminates described elsewhere herein. FIG. 1B is a schematic perspective view of a segment of the optical film 100. Optical film 100 includes a plurality of layers 102 having a total of (N) layers. The layers may be or include a plurality of alternating polymeric interference layers. FIG. 1B illustrates alternating higher index (A-layers) and lower index (B-layers) layers 102a and 102b. The higher index layers have an index in at least one direction greater than an index of the lower index layers in the same direction. The higher index layers 102a may be referred to as first layers and the lower index layers 102b may be referred to as second layers.

In some embodiments, the plurality of alternating first and second polymeric layers 102a and 102b include less than about 900 layers, or less than about 500 layers, or less than about 300 layers. In some embodiments, the plurality of alternating first and second polymeric layers 102a and 102b include at least about 200 layers, or include a total number (N) of layers in a range of about 200 to about 300 layers. In some embodiments, optical film 100 has an average thickness t of less than about 500 microns, or less than about 200 microns, or less than about 100 microns, or less than about 50 microns. The average thickness refers to the thickness average over the area of the optical film. In some embodiments, the thickness is substantially uniform so that the thickness of the optical film is substantially equal to the average thickness t. In some embodiments, the optical film is formed into a curved shape and has a thickness variation resulting from the forming process. In some embodiments, each polymeric layer 102 has an average thickness of less than about 500 nm.

During use, light incident on a major surface of optical film 100 (e.g., film surface 104), depicted by incident light 110 may enter a first layer of optical film 100 and propagate through the plurality of interference layers 102, undergoing select reflection or transmission by optical interference depending on the polarization state of incident light 110. Incident light 110 may include a first polarization state (a) and a second polarization state (b) that are be mutually orthogonal to one another. In some embodiments, the optical film 100 is a reflective polarizer and the first polarization state (a) may be considered as the "pass" state while the second polarization state (b) may be considered as the "block" state. In some embodiments, optical film 100 is a polarizer oriented along a stretch axis 120 and not oriented along an orthogonal axis 122. In such embodiments, the polarization state of normally incident light having an electric field along the axis 122 is the first polarization state (a) and the polarization state of normally incident light having an electric field along the axis 120 is the second polarization state (b). The axis 122 may be referred to as the pass axis and the axis 120 may be referred to as the block axis. In some embodiments, as incident light 110 propagates through plurality of interference layers 102, portions of the light in the second polarization state (b) is reflected by adjacent interference layers resulting in the second polarization state (b) being reflected by optical film 100, while a portion of the light in the first polarization state (a) collectively passes through optical film 100.

Figure 1C:
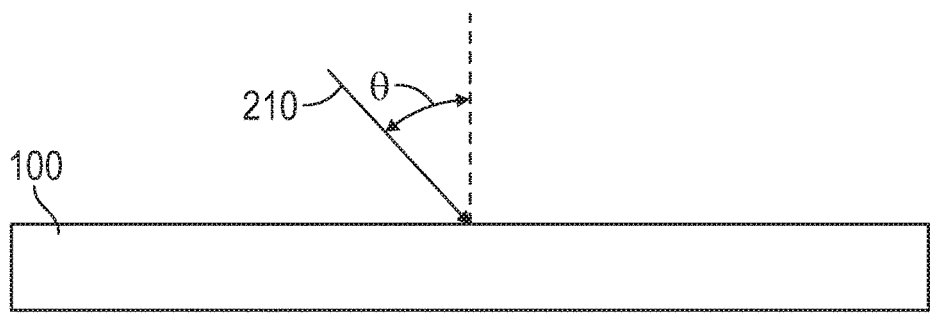
FIG. 1C is a schematic cross-sectional view of an optical film.

FIG. 1C is a schematic cross-sectional view of optical film 100 illustrating a light ray 210 incident on the optical film 100 at an angle of incidence θ. In some embodiments, optical film 100 has a first average reflectance for a first polarization state in a predetermined wavelength range (e.g., the visible wavelength range of 400 nm to 700 nm or other visible wavelength ranges described elsewhere herein) at a predetermined angle of incidence (e.g., an angle θ of 0 degrees or 60 degrees) and a second average reflectance for an orthogonal second polarization state in the predetermined wavelength range at the predetermined angle of incidence, where the second average reflectance greater than the first average reflectance. For example, in some embodiments, the second average reflectance is at least 20 percent and the first average reflectance is less than 15 percent. In some embodiments, the optical film 100 is a reflective polarizer having an average reflectance for normally incident light in a predetermined wavelength range polarized along a block axis of at least 20 percent and an average reflectance for normally incident light in the predetermined wavelength range polarized along a pass axis of less than 15 percent. In some embodiments, the average reflectance for normally incident light in the predetermined wavelength range polarized along the block axis is in a range of 25 to 75 percent. In some embodiments, the average reflectance for normally incident light in the predetermined wavelength range polarized along the pass axis is less than 10 percent.

In some embodiments, optical film 100 is a mirror film or a partial mirror film having a same or similar reflectivity for each of two orthogonal polarization states.

Figure 2A:
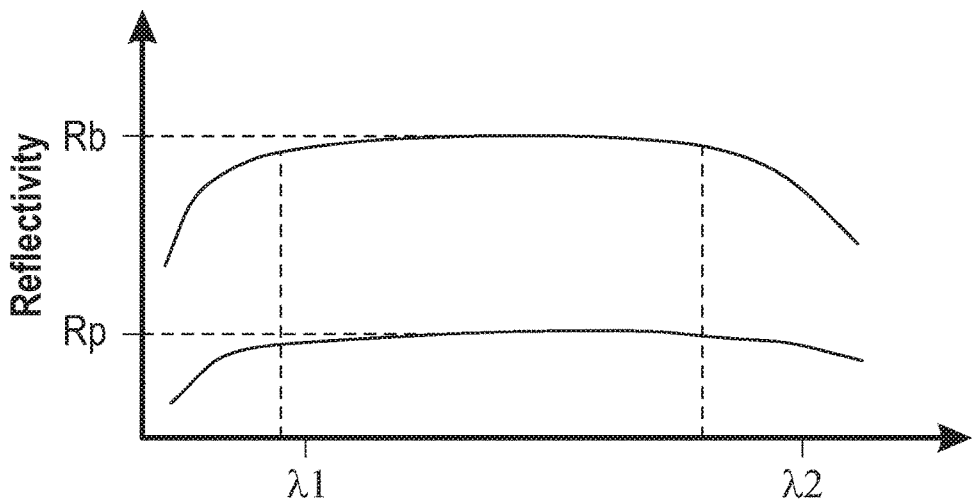
FIG. 2A is a schematic plot of the reflectivity of a reflective polarizer.

FIG. 2A is a schematic illustration of the reflectivity of a reflective polarizer, which may correspond to optical film 100, for light having a predetermined angle of incidence θ (e.g., 0 degrees or 60 degrees). The average block state (which may be a p-polarization state) reflectance Rb in the predetermined wavelength range from $\lambda 1$ (e.g., 400 nm, or 430 nm or 450 nm) to $\lambda 2$ (e.g., 650 nm or 700 nm) and the average pass state (which may be an s-polarization state) reflectance Rp in the predetermined wavelength range are illustrated. In some embodiments, the optical film 100 is a reflective polarizer having a higher reflectivity (e.g., at least 15%, or at least 20%, or at least 30%, or at least 40%, or at least 50%, or at least 60%, or at least 70%) for light at a predetermined angle of incidence (e.g., normally incident ($\theta=0$ degrees) or an angle of incidence θ of 60 degrees) in a predetermined wavelength range (e.g., at least 450 nm to 650 nm, or at least 430 nm to 650 nm, or at least 400 nm to 700 nm) having a block polarization state (e.g., polarized along the block axis 120) and a lower reflectivity (e.g., less than 15%, or less than 10%) for light at the predetermined angle of incidence in the predetermined wavelength range and having a pass polarization state (e.g., polarized along the pass axis 122). The reflectivity in the block state can be adjusted by adjusting the index difference between adjacent layers along the block axis and/or by adjusting the number of layers in the film. The desired reflectivity may depend on the desired application. For example, in some automotive applications, the desired average reflectivity in the block state (e.g., p-polarization state) for light at the predetermined angle of incidence in the predetermined wavelength range is in a range of 20% to 40%. As another example, in some display applications (e.g., in a recycling backlight of a liquid crystal display), the desired average reflectivity in the block state for light at the predetermined angle of incidence in the predetermined wavelength range is at least 70%, or at least 80%, or at least 85%, or at least 90%. In some embodiments, the desired reflectivity in the pass state for light at the predetermined angle of incidence in the predetermined wavelength range is less than 15% or less than 10%. In some embodiments, any reflectivity of the reflective polarizer in the pass state is primarily due to Fresnel reflections at an external surface of the reflective polarizer.

Figure 2B:
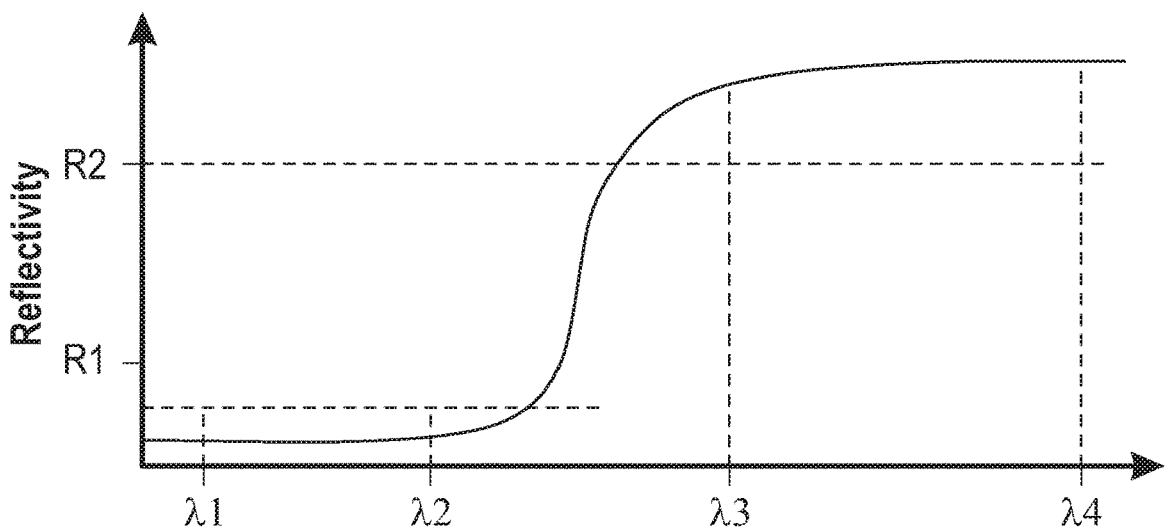
FIG. 2B is a schematic plot of the reflectivity of a mirror film.

In some embodiments, an optical stack includes optical film 100, which may be a reflective polarizer, and a mirror film bonded to the optical film 100. A mirror film substantially reflects orthogonal first and second polarization states in a predetermined wavelength range. The reflectance of a mirror film refers to reflectance of unpolarized light unless specified differently. The mirror film may be an infrared (IR) mirror film. FIG. 2B is a schematic illustration of the reflectivity of a mirror film that reflects less than R1 (R1 may be 20% or 15%, for example) for wavelengths in a range of λ1 to λ2 (e.g., the range from λ1 to λ2 may be the visible range from 400 nm to 700 nm) and reflects at least R2 (R2 may be at least 80% or at least 85%, for example) for wavelengths in a range of λ3 to λ4 (e.g., the range from λ3 to λ4 may be the range from 900 nm to 1200 nm). In some embodiments, the mirror film reflects less than 20% of normally incident visible light, and at least 80% of normally incident light in the wavelength range from 900 nm to 1200 nm.

Interference layers or microlayers may be described as reflecting and transmitting light primarily by optical interference when the reflectance and transmittance of the interference layers can be reasonably described by optical interference or reasonably accurately modeled as resulting from optical interference. Adjacent pairs of interference layers having different refractive indices reflect light by optical interference when the pair has a combined optical thickness (refractive index (along the block axis in the case of a reflective polarizer) times physical thickness) of ½ the wavelength of the light. Interference layers typically have a physical thickness of less than about 500 nm, or less than about 300 nm, or less than about 200 nm. In some embodiments, each polymeric interference layer has an average thickness (unweighted average of the physical thickness over the layer) in a range of about 45 nanometers to about 200 nanometers. Noninterference layers have an optical thickness too large to contribute to the reflection of visible light via interference. Noninterference layers typically have a physical thickness of at least 1 micrometer, or at least 5 micrometers. The interference layers 102 may be a plurality of polymeric interference layers reflecting and transmitting light primarily by optical interference in the predetermined wavelength range. The average thickness of the optical film including the interference layers and the noninterference layers may be less than about 500 microns.

In some embodiments, optical film 100 includes a plurality of alternating first and second layers 102a and 102b, the first layers 102a having a first in-plane birefringence being a difference in refractive index of the first layer 102a along a first in-plane direction 120 and a refractive index of the first layer 102a along a second in-plane direction 122, the second layers 102b having a second in-plane birefringence being a difference in refractive index of the second layer 102b along the first in-plane direction 120 and a refractive index of the second layer 102b along the second in-plane direction 122. In some embodiments, the second in-plane birefringence is less than the first in-plane birefringence and greater than 0.03. In some embodiments, the refractive indices along the first and second in-plane directions and along the thickness direction for each first layer 102a is the same as for each other first layer 102a. In some embodiments, the refractive indices along the first and second in-plane directions and along the thickness direction for each second layer 102b is the same as for each other second layer 102b. In some embodiments, the optical film 100 is a reflective polarizer including a plurality of alternating first and second layers 102a and 102b where the first layers 102a includes polyethylene terephthalate homopolymer, and the second layers 102b includes glycol-modified co(polyethylene terephthalate). In some embodiments, each first layer 102a is a polyethylene terephthalate homopolymer layer, and each second layer 102b is a glycol-modified co(polyethylene terephthalate) layer. In some embodiments, the optical film 100 has a shrinkage along the first in-plane direction 120 (or block axis 120) of greater than 4% and a shrinkage along the second in-plane direction 122 (or pass axis 122) of greater than 3% when heated at 150° C. for 15 minutes. In some embodiments, the shrinkage along the first direction 120 is greater than 5%, or 6%, or 7%, or 8% when heated at 150° C. for 15 minutes. In some such embodiments or in other embodiments, the shrinkage along the second direction 122 is greater than 3.5%, or 4%, or 5%, or 6%, or 7%, or 8% when heated at 150° C. for 15 minutes. In some embodiments, the shrinkage along the first direction 120 and the shrinkage along the second direction 122 are each greater than 5%, or 6%, or 7%, or 8% when heated at 150° C. for 15 minutes. In some embodiments, a difference $\Delta n1$ in refractive index between the first and second layers 102a and 102b along the first in-plane direction 120 is at least 0.03, and a difference $\Delta n2$ in refractive index between the first and second layers 102a and 102b along the second in-plane direction 122 has an absolute value $|\Delta n2|$ less than $\Delta n1$.

In some cases, the microlayers or interference layers have thicknesses and refractive index values corresponding to a ¼-wave stack, i.e., arranged in optical repeat units or unit cells each having two adjacent microlayers of equal optical thickness (f-ratio=50%), such optical repeat unit being effective to reflect by constructive interference light whose wavelength λ is twice the overall optical thickness of the optical repeat unit. The f-ratio is a ratio of the optical thickness of the first layer (assumed to be the higher index layer) in an optical repeat unit of first and second layers to the total optical thickness of the optical repeat unit. The f-ratios of the optical repeat units is often constant or substantially constant through the thickness of the optical film but can vary in some embodiments as described in U.S.

Pat. No. 9,823,395 (Weber et al.), for example. The f-ratio of an optical film is the average (unweighted mean) of the f-ratios of the optical repeat units. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. No. 5,360,659 (Arends et al.) and U.S. Pat. No. 5,103,337 (Schrenk et al.). Thickness gradients along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

Further details of multilayer optical films and related designs and constructions are discussed in U.S. Pat. No. 5,882,774 (Jonza et al.) and U.S. Pat. No. 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors", Science, Vol. 287, March 2000 (Weber et al.). The multilayer optical films and related articles can include additional layers and coatings selected for their optical, mechanical, and/or chemical properties. For example, a UV absorbing layer can be added at the incident side of the film to protect components from degradation caused by UV light. The multilayer optical films can be attached to mechanically reinforcing layers using a UV-curable acrylate adhesive or other suitable material. Such reinforcing layers may include polymers such as PET or polycarbonate, and may also include structured surfaces that provide optical function such as light diffusion or collimation, e.g. by the use of beads or prisms. Additional layers and coatings can also include scratch resistant layers, tear resistant layers, and stiffening agents. See, e.g., U.S. Pat. No. 6,368,699 (Gilbert et al.). Methods and devices for making multilayer optical films are discussed in U.S. Pat. No. 6,783,349 (Neavin et al.).

The reflective and transmissive properties of multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For ease of explanation in the present patent application, unless otherwise specified, the x-, y-, and z-axes are assumed to be local Cartesian coordinates applicable to any point of interest on a multilayer optical film, in which the microlayers extend parallel to the x-y plane, and where the x-axis is oriented within the plane of the film to maximize the magnitude of $\Delta n_x$. In these coordinates, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is determined by specifying that $\Delta n_x$ be non-negative. In other words, the refractive index differences between two layers forming an interface are $\Delta n_j = n_{1j} - n_{2j}$, where j=x, y, or z and where the layer designations 1, 2 are chosen so that $n_{1x} \geq n_{2x}$, i.e., $\Delta n_0 \geq 0$.

In practice, the refractive indices are controlled by judicious materials selection and processing conditions. A conventional multilayer film is made by co-extrusion of a large number, e.g. tens or hundreds of layers of two alternating polymers A, B, possibly followed by passing the multilayer extrudate through one or more multiplication die, and then stretching or otherwise orienting the extrudate to form a final film. The resulting film is typically composed of many of individual microlayers—hundreds or many hundreds— whose thicknesses and refractive indices are tailored to provide one or more reflection bands in desired region(s) of the spectrum, such as in the visible or near infrared. To achieve desired reflectivities with a reasonable number of layers, adjacent microlayers typically exhibit a difference in refractive index ($\Delta n_x$) for light polarized along the x-axis of at least 0.03, or at least 0.04. In some embodiments, materials are selected such that the difference in refractive index for light polarized along the x-axis is as high as possible after orientation. If reflectivity is desired for two orthogonal polarizations, then the adjacent microlayers also can be made to exhibit a difference in refractive index ($\Delta n_y$) for light polarized along the y-axis of at least 0.03, or at least 0.04.

In certain embodiments, multilayer reflective polarizers may be useful in automotive applications. For example, multilayer reflective polarizers may be used on or near at least a portion of a vehicle windshield. This application differs significantly from traditional liquid crystal display applications, because—for safety reasons—a driver should still be able to observe the road or surrounding environment through the multilayer reflective polarizer. Further, other drivers should not be dazzled or have their vision impaired by a bright reflection off the driver's windshield. A highly reflective (for one polarization state), high performance traditional reflective polarizer will not achieve these desired properties.

Further, previously known reflective polarizers are sensitive to the processing and environmental exposure involved in automotive assembly and general use. For example, reflective polarizers may be used with, processed with, or laminated to polyvinyl butyral (PVB) for safety glass shatter resistance. A component of the PVB-based material can penetrate and degrade conventionally made and designed reflective polarizers under the high-temperature processing used to form laminated windshield components. As another example, polyethylene naphthalates—particularly polyethylene naphthalates (PEN) including NDC (dimethyl-2,6-naphthalenedicarboxylate)—which are used as polymers and/or copolymers in many commercially available reflective polarizers, will yellow when exposed to ultraviolet radiation. The vehicle environment provides ample exposure to solar radiation, which will degrade the reflective polarizer over time. In such an ambient environment, spontaneous large-size crystallization may also occur, developing haze in the reflective polarizer. In some embodiments, reflective polarizers described herein do not include polyethylene naphthalate. In some embodiments, reflective polarizers described herein do not contain naphthalene-2,6-dicarboxylic acid. In some embodiments, reflective polarizers described herein do not have a refractive index in any layer, along any direction, greater than 1.7, measured at 550 nm.

Multilayer optical films are typically formed from alternating layers of two different polymers. One layer is a layer capable of developing birefringence when oriented. Because almost all polymers used in the formation of multilayer optical films increase in refractive index when stretched, this layer is also typically known as the high index layer (or high index optical (HIO) layer). The other layer of the alternating polymer layers is typically an isotropic layer, having an index of refraction equal or less than the indices of refraction of the high index layer. For this reason, this layer is typically referred to as the low index layer (or low index optical (LIO) layer). Conventionally, the high index layer is crystalline or semi-crystalline, while the low index layer is amorphous. This has been based at least on the belief that in order to get high enough block axis reflectivity (based on the mismatch between the high index layer and the low index layer along a certain in-plane direction) and low enough pass axis reflectivity (based on the matching between the high index layer and the low index layer along a second, orthogonal in-plane direction), that an amorphous material should be used.

It has now been found that a multilayer reflective polarizer with both high index layers and low index layers that have some degree of crystallinity developed during stretching due to the low stretching temperature of polyethylene terephthalate are especially suited for automotive applications. Accordingly, in some embodiments, a reflective polarizer includes a plurality of alternating first polymer layers and second polymer layers, where each of the first polymer layers and the second polymer layers exhibits crystallinity. Additionally, it has been found that multilayer reflective polarizers in which both the high index optical layers and the low index optical layers develop asymmetric index of refraction increases through stretching can be useful in automotive application. In some embodiments, each of the high index layers and the low index layers may develop or have an in-plane birefringence of at least 0.03 or at least 0.04. The in-plane birefringence is the difference in refractive index along an in-plane orientation direction (typically the direction where the oriented layers have the highest refractive index) and an orthogonal in-plane direction. For example, for a film in the x-y plane oriented along the x-direction, the in-plane birefringence is $n_x-n_y$. In some embodiments, a reflective polarizer having a shrinkage in any of the ranges described elsewhere herein when heated at 150° C. for 15 minutes includes a plurality of alternating first polymer layers 102a and second polymer layers 102b where each layer of the first polymer layers 102a and the second polymer layers 102b has an in-plane birefringence of at least 0.03, the in-plane birefringence being a difference in refractive index of the layer along a first in-plane direction 120 and a refractive index of the layer along an orthogonal second in-plane direction 122. In some embodiments, for at least one in-plane direction, the difference in refractive index between each of the first polymer layers and the second polymer layers is at least 0.03 or at least 0.04 (e.g., in a range of 0.03 or 0.04 to 0.1 or 0.15 or 0.25). In some embodiments, a difference $\Delta n1$ in refractive index between each of the first polymer layers and the second polymer layers along the first in-plane direction 120 is at least 0.03, and a difference $\Delta n2$ in refractive index between each of the first polymer layers 102a and the second polymer layers 102b along the second in-plane direction 122 has an absolute value $|\Delta n2|$ less than $\Delta n1$. In some embodiments, $\Delta n1$ is at least 0.04. In some such embodiments or in other embodiments, $|\Delta n2|$ is less than 0.04, or less than 0.03, or less than 0.02. The refractive index is determined at a wavelength of 532 nm, except where indicated differently.

During certain intermediate stretching steps, certain multilayer optical films may have similar birefringent properties; however, these films were subsequently subject to a heat setting process that minimized the birefringence in at least one of the layers (typically the low index, or isotropic layer) in order to maximize the block axis (stretch axis) reflectivity, meaning the final film (i.e., the film in roll form or the converted film) did not exhibit these properties. In some embodiments, the optical film or reflective polarizer has at least four edges (e.g., a final film in roll form or a converted film having at least four edges). In some embodiments, the high index layers are selected to be polyethylene terephthalate (PET) and the low index layers are selected to be a copolyester of polyethylene terephthalate with cyclohexane dimethanol used as a glycol modifier (PETG, such as available from Eastman Chemicals, Knoxville, Tenn.). In some embodiments, the high index layers are selected to be PET and the low index layers are selected to be a 50:50 (by weight) blend of PETG and PCTG (also a polyethylene terephthalate with cyclohexane dimethanol as a glycol modifier, but with twice the modifier as for PETG, available from Eastman Chemicals, Knoxville, Tenn.). In some embodiments, the high index layers are selected to be PET and the low index layers are selected to be a 33:33:33 (by weight) blend of PETG, PCTG, and an "80:20" copolyester derived from 40 mol % terephthalic acid, 10 mol % isophthalic acid, 49.75 mol % ethylene glycol, and 0.25 mol % trimethyl propanol. Other copolyesters may be useful as or in low index layers described herein. In some embodiments, an optical film such as a reflective polarizer includes alternating first and second layers where each first layer includes polyethylene terephthalate homopolymer and each second layer includes glycol-modified co(polyethylene terephthalate). For example, in some embodiments, each second layer includes glycol-modified co(polyethylene terephthalate) which includes a first glycol-modified co(polyethylene terephthalate) and optionally a different second glycol-modified co(polyethylene terephthalate). In some embodiments, each second layer further includes a copolyester different from the first and second glycol-modified co(polyethylene terephthalate)s.

Reflective polarizers or other optical films including materials such as the exemplary sets above have been found to exhibit better inhibition of haze after high temperature exposure, due to the crystallization being developed gradually during processing rather than spontaneously (with accompanying larger crystal sites) during exposure to radiation or heat. Further, cosmetic and appearance issues such as wrinkling or delamination appear to occur significantly less frequently with the crystalline materials combinations exemplified herein. Reflective polarizers with crystallinity in both the high index and the low index layers also perform better with respect to chemical resistance and permeability (edge ingress) of other materials. Benefits of the material combinations described herein are described further in PCT Appl. No. IB2019/050541 and corresponding U.S. Prov. Pat. Appl. No. 62/622,526.

Shrinkage of the optical films of the present description may be larger than conventional multilayer optical films. If has been found that then an optical film is laminated to a glass layer or between glass layers that a high degree of shrinkage (e.g., greater than 3% shrinkage along each of two orthogonal in-plane directions and greater than 4% shrinkage along at least one in-plane direction) can substantially reduce or prevent distortion (e.g., wrinkles) in the optical film during the lamination. The shrinkage can be controlled by controlling the stress during cooling of the film after stretching the film. It has generally been found that a higher stress during this cooling results in a larger shrinkage. In some embodiments, after stretching the film a heat set is applied. The heat set can be carried out in the last zones of the tenter oven used to orient the film as described in U.S.

Pat. No. 6,827,886 (Neavin et al.). Typically, such heat set processes are used in order to reduce or minimize the shrinkage of the film when heat is subsequently applied to the film. When it is desired to minimize the subsequent shrinkage of the film, the heat set temperature may be set to the highest temperature that does not result in film breakage in the tenter and the film can be relaxed in the transverse direction in the vicinity of the heat-set zone which decreases the tension of the film. Higher shrinkage, particularly in the machine direction (typically along the pass axis when the optical film is a reflective polarizer) can be achieved by reducing the heat set temperature, by reducing the duration of the heat set treatment for a given heat set temperature and/or by eliminating the heat set step. Higher shrinkage, particularly in the transverse direction (typically along the block axis when the optical film is a reflective polarizer), can be achieved reducing the relaxation of the film in the block direction. This can be done, for example, by adjusting the spacing between the tenter rails after heat setting. Reducing this spacing is often referred to as toe-in. The effects of heat set temperature and toe-in on film shrinkage are described in U.S. Pat. No. 6,797,396 (Liu et al.), for example. Thus, by controlling the heat set and toe-in conditions, desired shrinkages in the transverse direction (e.g., greater than 4%, or greater than 5%, or greater than 6%, or greater than 7%, or greater than 8%; and in some embodiments, less than 20%, or less than 15%) and in the machine direction (e.g., greater than 3%, or greater than 3.5%, or greater 4%, or greater than 5%, or greater than 6%, or greater than 7%, or greater than 8%; and in some embodiments, less than 20%, or less than 15%, or less than 12%) when the optical film heated at 150° C. for 15 minutes can be achieved. Shrinkage of an optical can be determined according to the ASTM D2732-14 test standard, "Standard Test Method for Unrestrained Linear Thermal Shrinkage of Plastic Film and Sheeting", for example.

Figure 3:
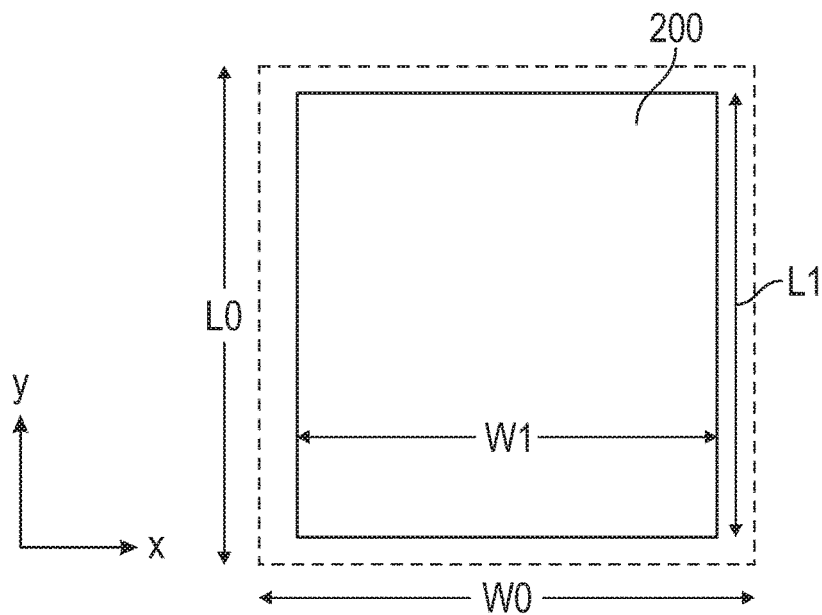
FIG. 3 is a schematic top view of a film.

Shrinkage of a film (e.g., a reflective optical film such as a reflective polarizer) is schematically illustrated in FIG. 3. The film 200 prior to heating has a length L0 along the y-direction and a width W0 along the x-direction, and the film 200 after heating at 150° C. for 15 minutes has a length L1 and a width W1. The shrinkage along the x-direction is given by (W0−W1)/W0 times 100% and the shrinkage along the y-direction is given by (L0−L1)/L0 times 100%.

Optical films, such as reflective polarizers, described herein also may have an f-ratio that is higher than 0.5. In some embodiments, the f-ratio may be at least 0.55, at least 0.6, at least 0.65, at least 0.7, at least 0.75, at least 0.8, or at least 0.85. The shift in f-ratio higher than 0.5 dampens the first order reflection bands of the multilayer reflective polarizer in favor of higher order reflection bands, effectively reducing the reflectivity of the polarizer for the designed wavelength range. Similar optical effects are observed for f-ratios lower than 0.5; for example, f-ratios less than 0.45, less than 0.4, less than 0.35, less than 0.3, less than 0.25, less than 0.2, or even less than 0.15. Combined with the lesser developed birefringence that occurs from stretching PET (compared to PEN or a coPEN), these reflective polarizers may need to include more layers to reach desired levels of reflectivity. Counterintuitively, this is a design feature in some embodiments. For weak reflective polarizers, microlayer caliper variation can have a substantial and disproportionate effect on the overall spectrum of the film. By making each individual microlayer pair even weaker, layers can be added to the design that reinforce and overlap the reflective bands of neighboring microlayer pairs. This smooths the spectrum and allows for more consistent performance, regardless of position on the film web or even from roll to roll. Optical films described herein may have at least 100 layers, at least 150 layers, at least 200 layers, or at least 250 layers.

Reflective polarizers or other optical films described herein may have resistance to haze even after exposure to heat. In some embodiments, reflective polarizers may have no more than 1% haze when measured after 100 hours' exposure to 85° C., 95° C., or even 105° C. In some embodiments, reflective polarizers may have no more than 2% haze after 100 hours' exposure to 105° C. or even 120° C. In some embodiments, reflective polarizers may have no more than 3% or 3.5% haze after 100 hours' exposure to 120° C. In some embodiments, the transmission of these reflective polarizers may be unaffected or substantially unaffected by even a short exposure to extreme heat, such as in an annealing step. In some embodiments, the transmission spectrum from 400 nm to 800 nm drops by no more than 10% or even no more than 5% after a 232° C. (450° F.) for 30 seconds annealing step.

Optical films, such as reflective polarizers, as described herein are useful for automotive applications, but can also be used or suitable for certain polarizing beam splitter/view combiner applications. For example, for certain augmented reality displays or display devices, a generated and projected image may be superimposed over a wearer's frame of view. Many of the advantages that may be suitable for, for example, a heads up display for automotive applications, may be similarly desirable in these augmented reality applications.

Figure 4:
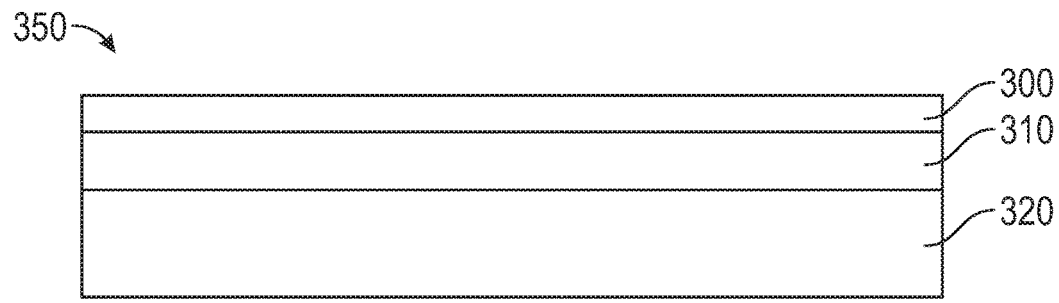
FIGS. 4-5 are schematic cross-sectional views of glass laminates.
Figure 5:
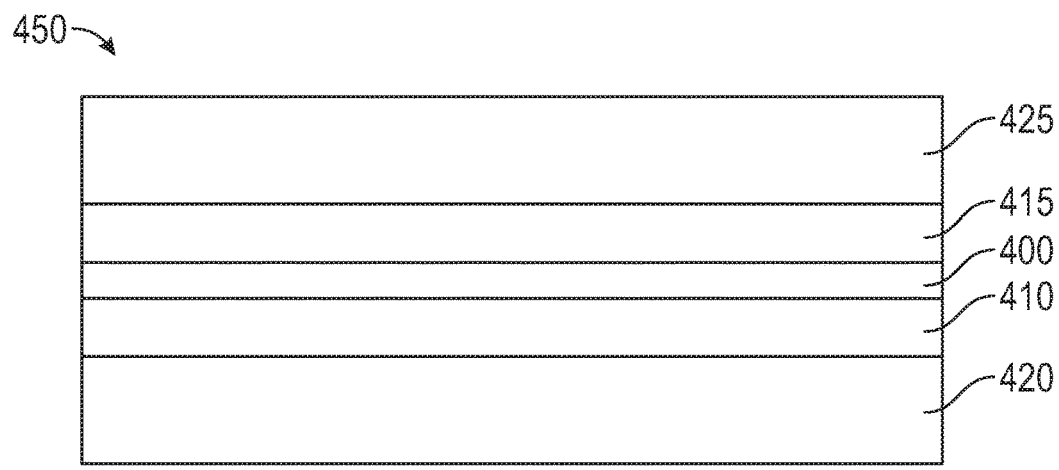

FIG. 4 is a schematic cross-sectional view of a glass laminate 350 including an optical film 300 bonded to a glass layer 320 through an adhesive layer 310. In some embodiments, a second glass layer is included in a glass laminate. FIG. 5 is a schematic cross-sectional view of a glass laminate 450 including an optical film 400 disposed between and bonded to first and second glass layers 420 and 425 through respective first and second adhesive layers 410 and 415. The optical film 300 or 400 may be any optical film, reflective film, or reflective polarizer of the present description, at least prior to bonding the film to the glass layer(s). After the bonding process, the film may not have the same degree of shrinkage upon subsequent heating as the film had prior to the bonding process.

Figure 6:
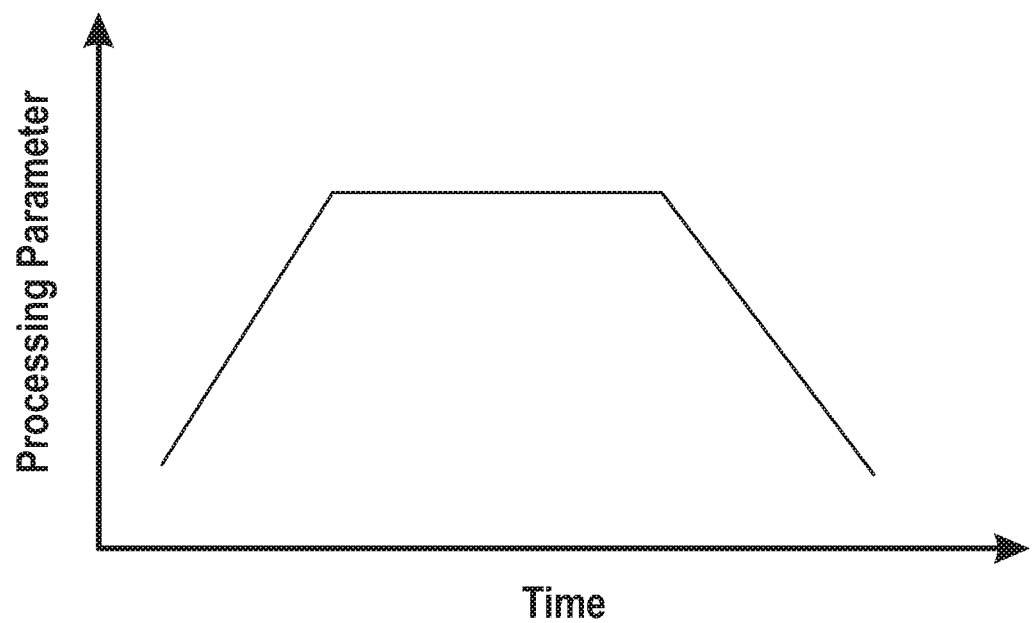
FIG. 6 is a schematic plot of a processing parameter versus time.

In some embodiments, a method of making a glass laminate, (e.g., glass laminate 350 or 450) includes providing a reflective film (e.g., optical film 100 or 200 or 300 or 400), and bonding the reflective film to at least a first glass layer to provide the glass laminate. In some embodiments, the reflective film is an optical stack including an optical film or reflective polarizer described elsewhere herein and further including an additional layer or element. The additional layer or element can include one or more of an IR mirror film, a resistive element, or a heat spreading layer. In some embodiments, bonding the reflective film to at least the first glass layer includes disposing the reflective film (e.g., optical film 400) between the first glass layer 420 and the second glass layer 425 and bonding the reflective film to the first and second glass layers 420 and 435 through respective first and second adhesive layers 410 and 415. In some embodiments, bonding the reflective film to at least the first glass layer includes bonding at a temperature of at least 120° C. and a pressure of at least 0.9 MPa. In some embodiments, an autoclave is used to bond the reflective film to the glass layer(s). The temperature and pressure may be ramped up to a temperature of at least 120° C. and a pressure of at least 0.9 MPa and held for a period of time (e.g., at least 10 minutes or at least 15 minutes) at the elevated temperature and pressure after which time the temperature and pressure may be ramped down to room temperature and atmospheric pressure. This is schematically illustrated in FIG. 6 which is a schematic plot of a processing parameter, which may represent pressure and/or temperature, as a function of time. The parameter is ramped up from an ambient condition to a constant value (e.g., a temperature of at least 120° C. and/or a pressure of at least 0.9 MPa) for some predetermined time and then ramped back down to the ambient condition.

In some embodiments, optical film 400 is a reflective polarizer In some embodiments, a method of making a glass laminate 450 includes: first and second glass layers 420 and 425; disposing a reflective polarizer (or other optical film or optical stack) between the first and second glass layers 420 and 425 where the reflective polarizer includes a plurality of alternating polymeric interference layers reflecting and transmitting light primarily by optical interference; disposing first and second adhesive layers 410 and 415 between the reflective polarizer and the respective first and second glass layers 420 and 425; laminating the reflective polarizer to the first and second glass layers 420 and 425 at a temperature of at least 120° C. and a pressure of at least 0.9 MPa to provide the glass laminate 450. In some embodiments, the laminating step incudes laminating the reflective polarizer to the first and second glass layers at a temperature of at least 120° C. and a pressure of at least 0.9 MPa for at least 15 minutes. In some embodiments, at least prior to the laminating step, the reflective polarizer has a shrinkage along a block axis of the reflective polarizer of greater than 4% and a shrinkage along an orthogonal pass axis of greater than 3% when heated at 150° C. for 15 minutes. The shrinkages along the block and pass axes may be any of the ranges described elsewhere herein.

Figure 7A:
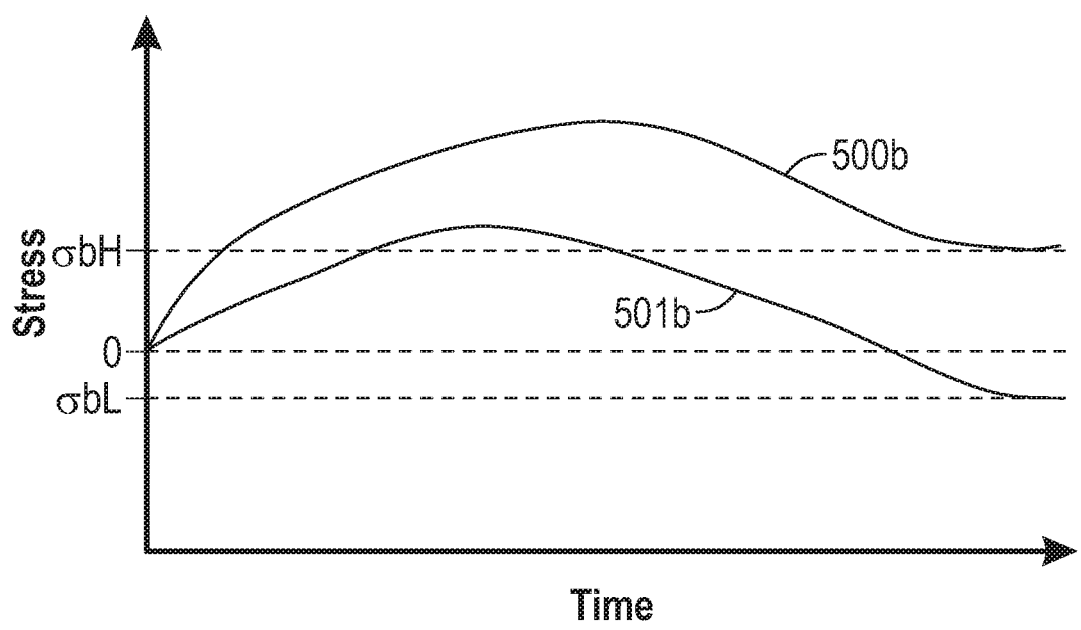
FIGS. 7A-7B are schematic plots of tensile stress in reflective polarizers along block and pass axes, respectively, versus time during lamination.
Figure 7B:
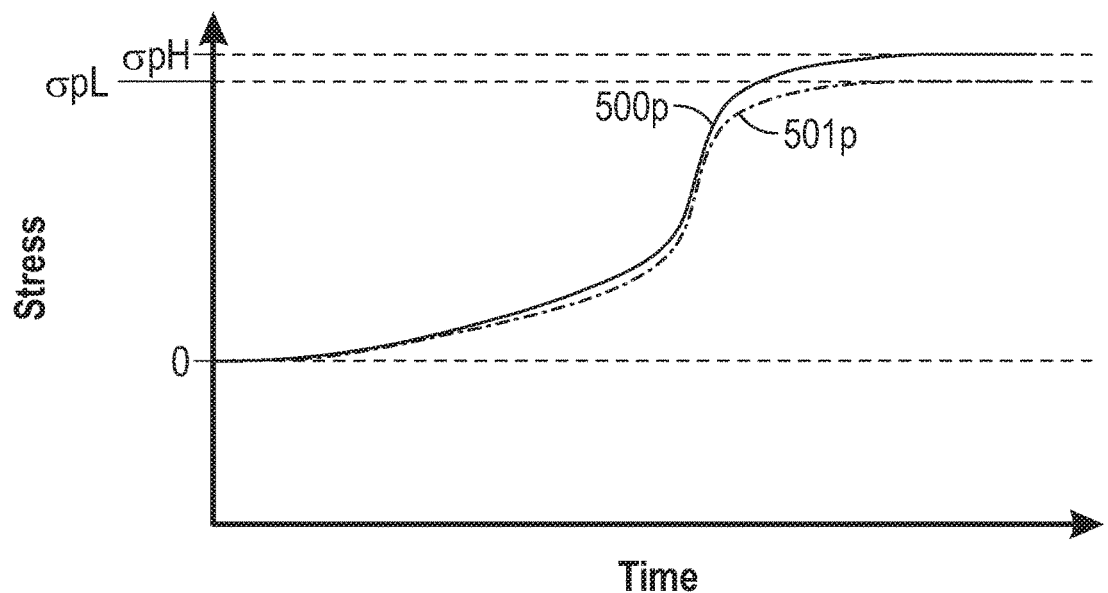

In some embodiments, the shrinkage of the optical film during lamination to one or more glass layers results in tensile stress in the optical film. A tensile stress in a film along a direction is a force along the direction per unit area in a cross-section of the film perpendicular to the direction and is positive when the film is under tension along the direction. FIGS. 7A-7B are schematic plots of tensile stress in reflective polarizers along the block axis (transverse direction) and pass axis (machine direction), respectively, versus time during the lamination of the reflective polarizer to glass layer(s). In FIG. 7A, the tensile stress 500b in a reflective polarizer of the present description along the block axis has a positive tensile stress σbH after lamination and the tensile stress 501b for a comparative reflective polarizer having a conventional low shrinkage along the block axis has a negative tensile stress σbL after lamination indicating that the film is under some compression. This assumes the film does not buckle or wrinkle to reduce or eliminate the compression. However, the film will typically buckle or wrinkle when the film is under compression.

In FIG. 7B, the tensile stress 500p in a reflective polarizer of the present description along the pass axis has a positive tensile stress σpH after lamination and the tensile stress 501p for a comparative reflective polarizer having a conventional low shrinkage along the block axis has a tensile stress σpL after lamination which is less than σpH. In some embodiments, a glass laminate (e.g., glass laminate 350 or 450) includes a first glass layer and a reflective polarizer laminated to the first layer. The reflective polarizer includes a plurality alternating polymeric interference layers reflecting and transmitting light primarily by optical interference and defining a block axis and an orthogonal pass axis. In some embodiments, the reflective polarizer has a tensile stress of at least 0.5 MPa along the block axis and a tensile stress of at least 0.5 MPa along the pass axis. In some embodiments, the tensile stress along the block axis is at least 1 MPa, or at least 2 MPa, or at least 3 MPa. In some such embodiments, or in other embodiments, the tensile stress along the pass axis is at least 1 MPa, or at least 2 MPa, or at least 3 MPa, or at least 5 MPa, or at least 7 MPa, or at least 9 MPa, or at least 10 MPa, or at least 11 MPa, or at least 11.5 MPa.

Figure 8:
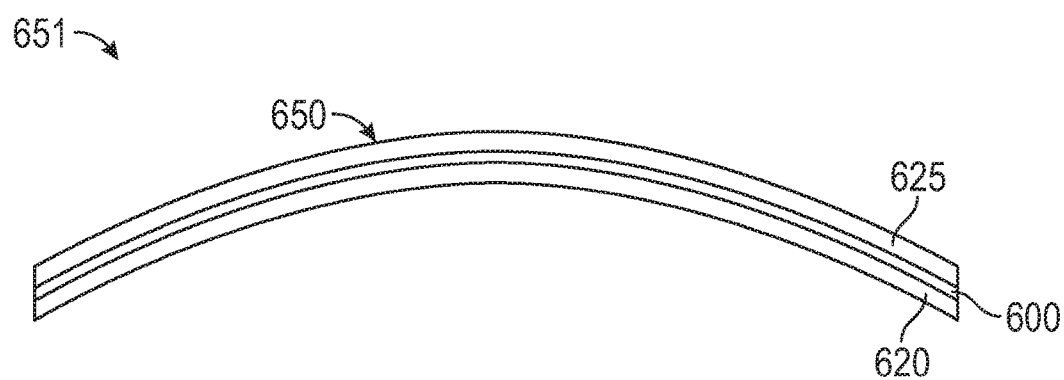
FIG. 8 is a schematic cross-sectional view of an automobile windshield.

In some embodiments, the glass laminate is curved (e.g., for use in a windshield or a curved display). FIG. 8 is a schematic cross-sectional view of an automobile windshield 651 including glass laminate 650. Glass laminate 650 includes an optical film or optical stack 600 disposed between first and second glass layers 620 and 625. The optical film or optical stack 600 may correspond to any of the optical films or optical stacks of the present description. Adhesive layer (not illustrated), such as PVB layers may be included between the optical film or optical stack and the glass layers 620 and 625. The windshield 651 may further include other layers or elements disposed on the glass laminate 650. For example, in some embodiments, the windshield 651 includes adhesive layer(s) near edges of the glass laminate 650 for attaching the windshield to an automobile.

Figure 9A:
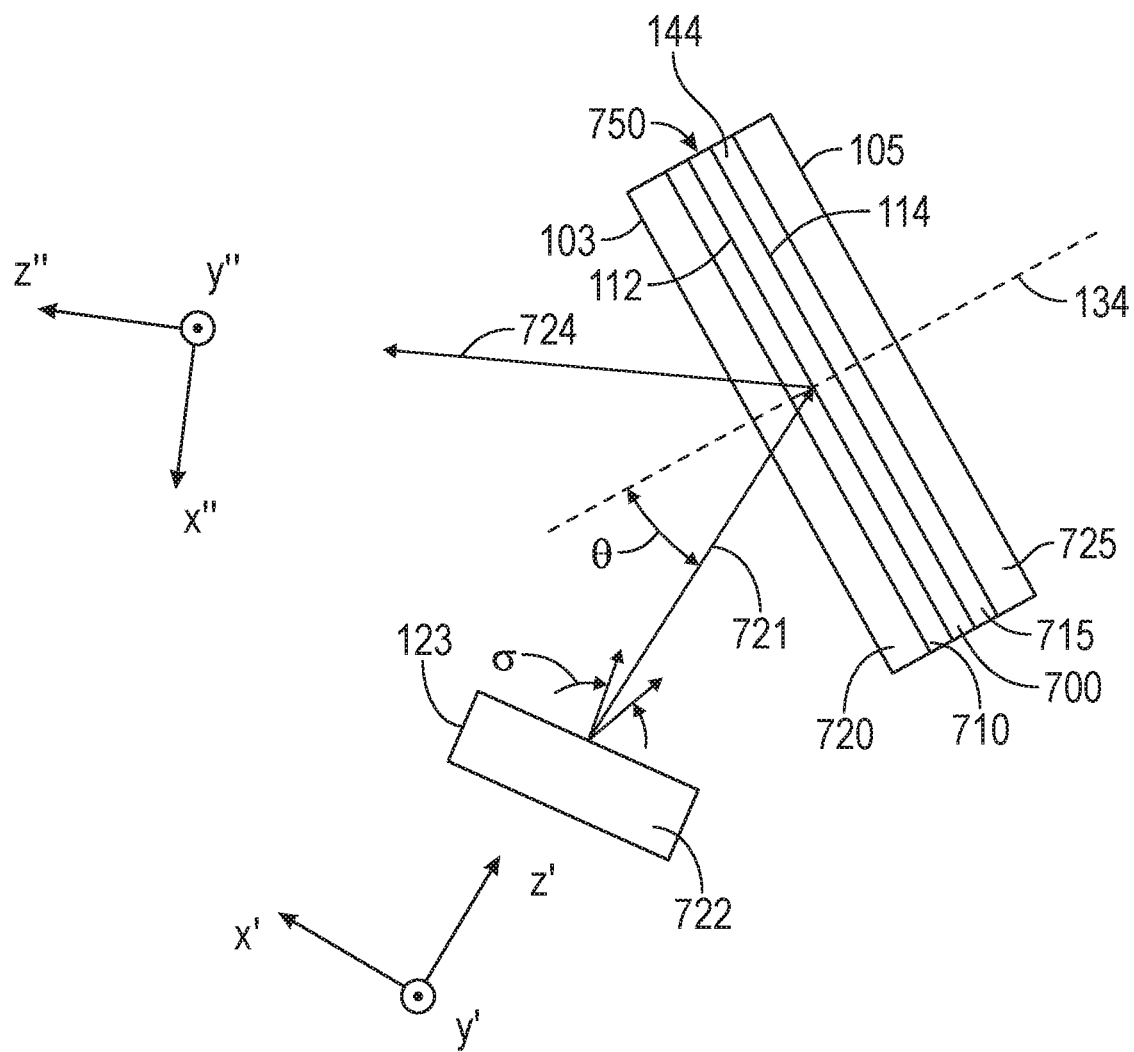
FIGS. 9A-9B are schematic cross-sectional views of a glass laminate and a light source.

FIG. 9A is a schematic cross-sectional view of a glass laminate 750 and a light source 722. The glass laminate 750 includes first and second glass layers 720 and 725 having outermost major surfaces 103 and 105 facing away from one another, and a reflective film 700 having opposed first and second major surfaces 112 and 114 and disposed between the first and second glass layers 720 and 725 with the first and second major surfaces 112 and 114 facing the respective first and second glass layers 720 and 725. The reflective film 700 may be an optical film, reflective polarizer, or optical stack described elsewhere herein. In some embodiments, the outermost major surfaces 103 and 105 are substantially parallel. In other embodiments, the outermost major surfaces 103 and 105 may taper towards one another to reduce ghosting, for example, as described in U.S. Pat. Appl. Publ. No. 2017/0313032 (Arndt et al.), for example. A light ray 721 from the light source 722 making an angle of incidence θ (angle between incident direction and normal 134) with the glass laminate 750 is reflected from the reflective film 700 as reflected light ray 724. Light ray 721 propagates along the z' direction referring to x'-y'-z' coordinate system of FIG. 9A and light ray 724 propagates along the z" direction referring to x"-y"-z" coordinate system of FIG. 9A. In some embodiments, the reflective film 700 has an average reflectance for a first polarization state (e.g., polarization state 131 depicted in FIG. 9B which is a p-polarization state in the illustrated embodiment) in a predetermined visible wavelength range at a predetermined angle of incidence of at least 15%, or at least 20%, or at least 30% and an average transmittance for an orthogonal second polarization state (e.g., polarization state 132 depicted in FIG. 9B which is an s-polarization state in the illustrated embodiment) in the predetermined visible wavelength range at the predetermined angle of incidence of at least 30%, or at least 50%, or at least 70%, or at least 80%, or at least 85%, or at least 90%. In some embodiments, the reflective film 700 is a reflective polarizer having an average reflectance for normally incident light in a predetermined wavelength range polarized along the block axis of at least 20 percent (e.g., in a range of 25% to 75%) and an average reflectance for normally incident light in the predetermined wavelength range polarized along the pass axis of less than 15 percent or less than 10 percent. In some embodiments, the reflective film 700 includes a plurality of alternating polymeric interference layers as described further elsewhere herein. The glass laminate 750 includes a first adhesive layer 710 disposed between and bonding together the first glass layer 720 and the reflective film 700, and a second adhesive layer 715 disposed between and bonding together the second glass layer 725 and the reflective film 700.

The second adhesive layer 715 can optionally include an optically absorbing material 144 which may be dyes, pigments, or a combination thereof. The absorbing material 144 can alternatively or in addition be dispersed in a polymeric material of a skin layer (e.g., 240 or 241 depicted in FIGS. 11A-11B). In some embodiments, at least one of the inference layers of the optical film is oriented along a first direction, and the optically absorbing material is or includes a dichroic dye at least partially oriented along the first direction. The optically absorbing material may be included to reduce the brightness of a ghost image reflected from the outermost major surface 105.

Figure 9B:
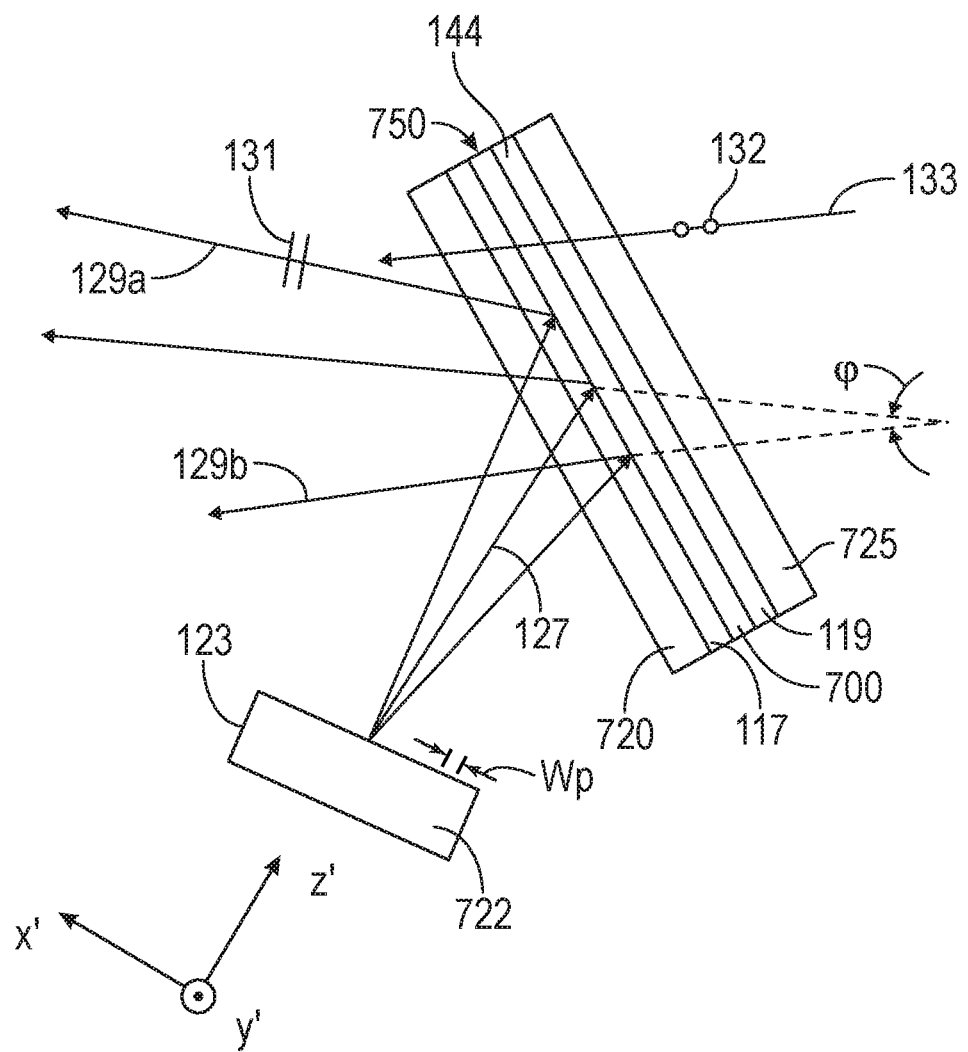

In some embodiments, the light source 722 emits or projects an image of a straight line having a projected luminance distribution about a centerline of the projected line having a full width at half maximum σ. The term centerline is used to refer to a curve or line which may or may not be a straight line (e.g., the centerlines may be curved and/or irregular). The luminance distribution may be expressed as a function of the x'-coordinate illustrated in FIG. 9A or in terms of an angle from a peak luminance direction or from a central ray 127 as schematically illustrated in FIG. 9B. Non-central rays 129a and 129b are also illustrated in FIG. 9B. Ray 129b makes an angle φ with the central ray 127. The luminance distribution can be expressed in terms of the angle φ, where positive φ in FIG. 9B corresponds to positive x'-coordinate in FIG. 9A. The luminance distribution can be determined using a detector having an input aperture in a plane perpendicular to a central ray reflected from the reflective film 700 (e.g., the x'-y' plane referring to the x'-y'-z' coordinate system of FIGS. 9A-9B). Suitable detectors include the PROMETRIC I8 imaging colorimeter available from Radiant Vision Systems (Redmond, WA). The luminosity, which may also be referred to a brightness, can be defined as an integral over wavelengths of the radiance times the photopic luminosity function defined by the Commission Internationale de l'Éclairage (CIE) in the CIE 1931 color space. Any relations described herein regarding luminance or luminance distribution may also hold for radiance or radiance distribution or for intensity or intensity distribution.

In some embodiments, the light source 722 projects polarized light having a first polarization state 131. An ambient light ray 133 having a second polarization state 132 is illustrated in FIG. 9B as being transmitted through reflective film 700 which may be a reflective polarizer. The light source 722 may be or include a display such as a liquid crystal display (LCD) or an organic light emitting diode (OLED) display. In some embodiments, various optical components (e.g., curved mirror(s) and/or optical lens(es)) are included in the light source 722 to provide the desired light output to the glass laminate 750.

In some embodiments, a glass laminate 750 includes first and second glass layers 720 and 725; and a reflective film 700 including a plurality of alternating polymeric interference layers and disposed between (e.g., disposed substantially symmetrically between) and adhered to the first and second glass layers 720 and 725 such that when a plurality of parallel straight lines is projected onto the glass laminate 750 along a first direction (z'-direction) making an angle θ in a range of 40 degrees to 75 degrees with respect to a normal 134 to the glass laminate 750 so that the plurality of parallel straight lines extend along a second direction (y'-direction) orthogonal to a plane of incidence (x'-z'-plane) defined by the first direction and the normal 134, each projected straight line reflects from the reflective film 700 as a reflected line, each reflected line having a luminance distribution defining a centerline of the reflected line. In some embodiments, the reflective film 700 is disposed substantially symmetrically (e.g., the distance between the film 700 and the first glass layer 720 and the distance between the film 700 and the second glass layer 725 may be within 20% or within 10% of each other). In some embodiments, the outer major surfaces of the glass laminate 750 are parallel or substantially parallel to one another.

In some embodiments, a distribution of an angle α between the centerlines of the reflected lines and the second direction have a standard deviation of less than 2.5 degrees. In some embodiments, the standard deviation is less than less than 2.4 degrees, or less than 2.2 degrees, or less than 2 degrees, or less than 1.9 degrees, or less than 1.8 degrees. In some embodiments, the plurality of parallel straight lines is projected from a display surface 123 onto the glass laminate 750 along the first direction where each straight line has a substantially same line width on the display surface 123. In some embodiments, each projected straight line reflects from the reflective film 700 as a reflected line such that an image of the reflected line has a luminance distribution in an image plane where a magnification from the display surface to the image plane is about 1 (e.g., within 10%, or within 5% of 1). In some embodiments, the luminance distribution of the image of each reflected line having a standard deviation about a best fit straight line, a mean of the standard deviations being less than 0.9 times the line width. In some embodiments, the mean of the standard deviations is less than 0.85, or 0.8, or 0.7, or 0.75 times the line width.

In some embodiments, the reflective film 700 is or includes a reflective polarizer having a block axis and an orthogonal pass axis. In some embodiment, the pass axis substantially parallel (e.g., parallel to with 30 degrees, or within 20 degrees, or within 10 degrees, or within 5 degrees) to the second direction (y'-direction).

Figure 10A:
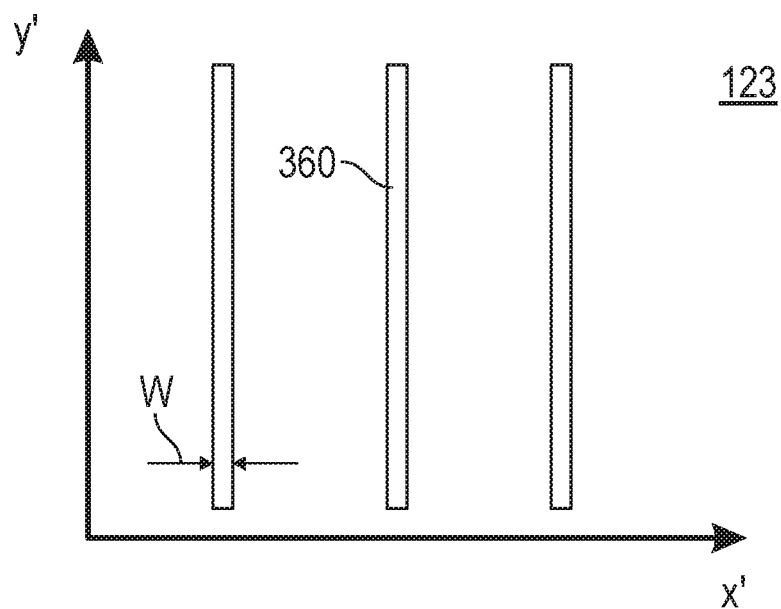
FIG. 10A is a schematic illustration of a plurality of parallel straight lines.

FIG. 10A is a schematic illustration of a plurality of parallel straight lines 360 which can be projected by a light source 722 onto the glass laminate 750. In some embodiments, the plurality of parallel straight lines 360 is projected from a display surface 123 where each straight line has a substantially same line width W on the display surface 123. In some embodiments, W is substantially equal (e.g., equal to with 10% or to within 5%) to a pixel width Wp (indicated schematically in FIG. 9B) on the display surface 123.

Figure 10B:
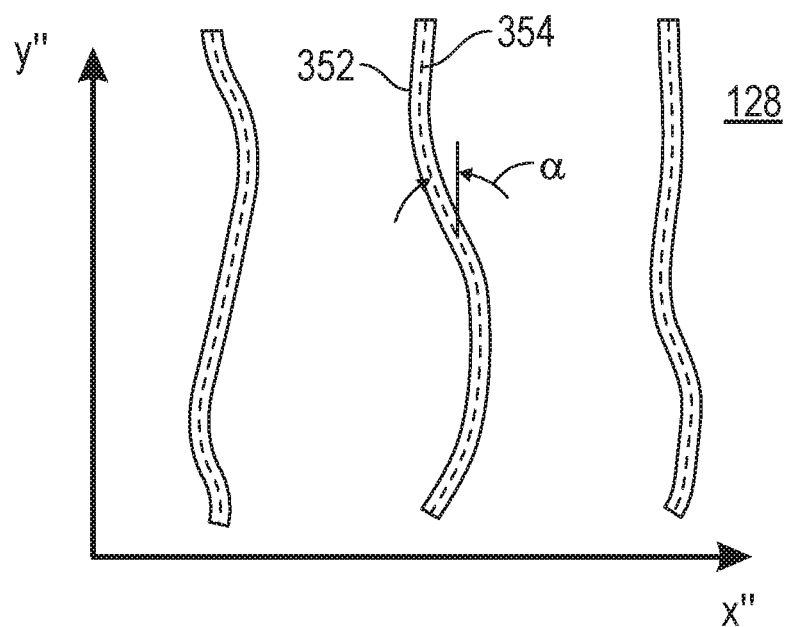
FIG. 10B is a schematic illustration of reflected images of the parallel straight lines of FIG. 10A.

FIG. 10B is a schematic illustration of reflected image 352 of the plurality of parallel lines 360. Centerlines 354 defined by a luminance distribution (schematically indicated by the width of the reflected lines) of the reflected lines are indicated. An angle α between the centerlines 354 and the y"-direction (see FIGS. 9A-9B) is schematically illustrated. FIG. 10A is a representation of the lines 360 on a display surface 123 and FIG. 10B is a representation of the reflected lines in an image plane 128 (e.g., an image plane of a detector or camera detecting the reflected line). In some embodiments, the magnification from the display surface 123 to the image plane 128 is about 1.

Figure 10C:
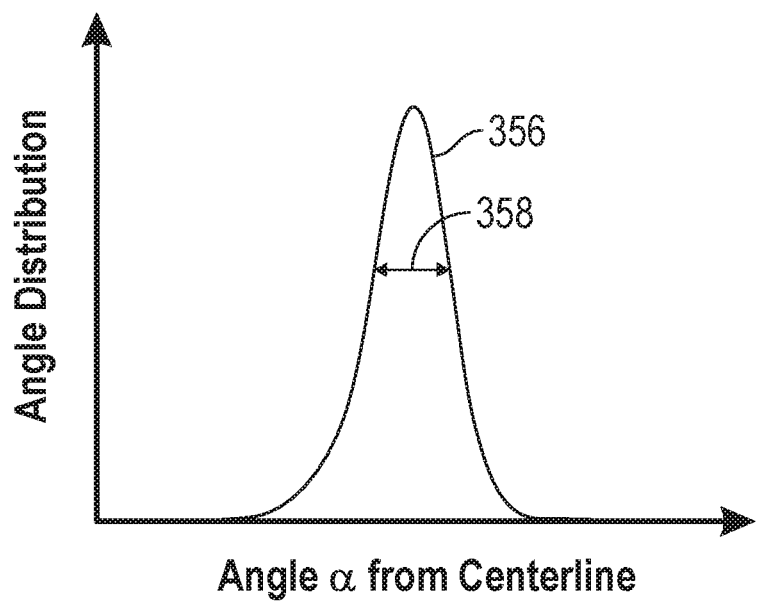
FIG. 10C is a schematic illustration of a distribution of an angle between centerlines of the reflected images of FIG. 10B and a fixed direction.

FIG. 10C is a schematic illustration of a distribution 356 of an angle α between centerlines 354 of the reflected images 352 and the y'''-direction). The distribution 356 has a standard deviation 358 which may be less than 2.5 degrees or may be in any of the ranges described elsewhere herein.

Figure 10D:
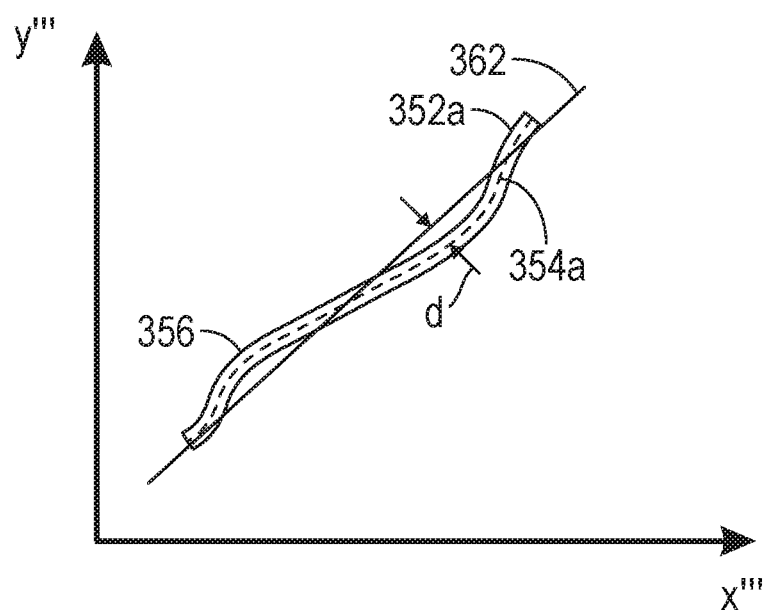
FIG. 10D is a schematic plot of a reflected line having a centerline and a best fit straight line.

FIG. 10D is a schematic plot of a reflected line 252a having a centerline 354a and a best fit straight line 362. The plot is illustrated in x'''-y''' coordinates which are obtained from the x''-y'' coordinates by rotating about the z'' axis (e.g., by about 45 degrees). FIG. 10D may be an image plane and 352a may be an image of the reflected line. The luminance distribution 356 of the image has a standard deviation d about a best fit straight line 362. The rotation to x'''-y''' coordinates is useful for certain calculations; however, the standard deviation d may equivalently be calculated using x''-y'' coordinates. In some embodiments, a mean of the standard deviations d of the images of the reflected lines is less than 0.9 times the line width W (see FIG. 10A) or is in any of the ranges described elsewhere herein.

Figure 11A:
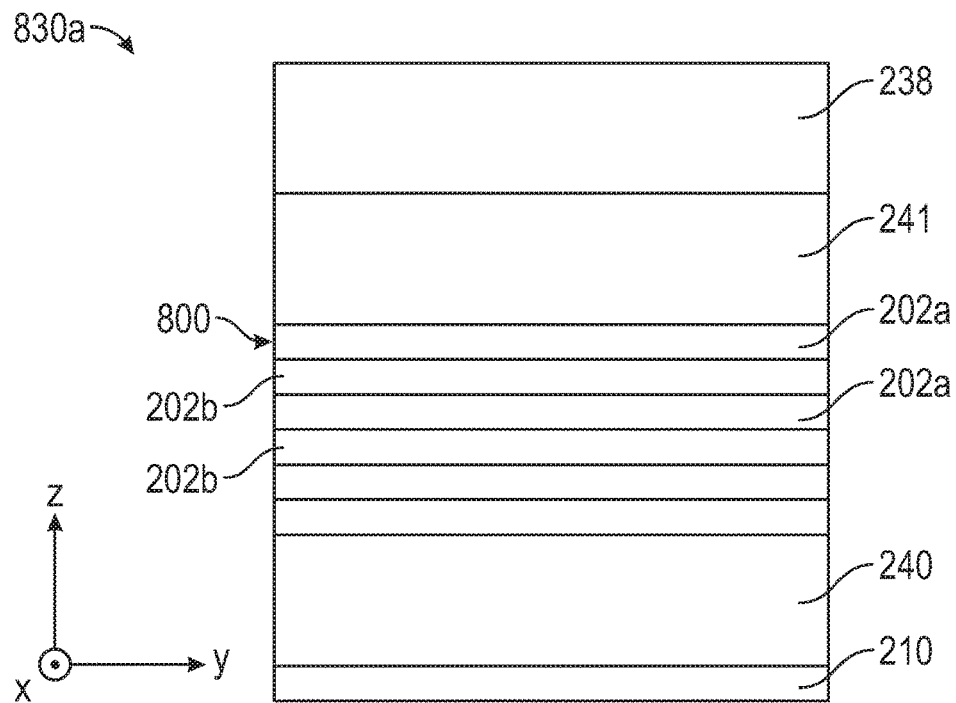
FIGS. 11A-11B are schematic cross-sectional views of optical stacks.
Figure 11B:
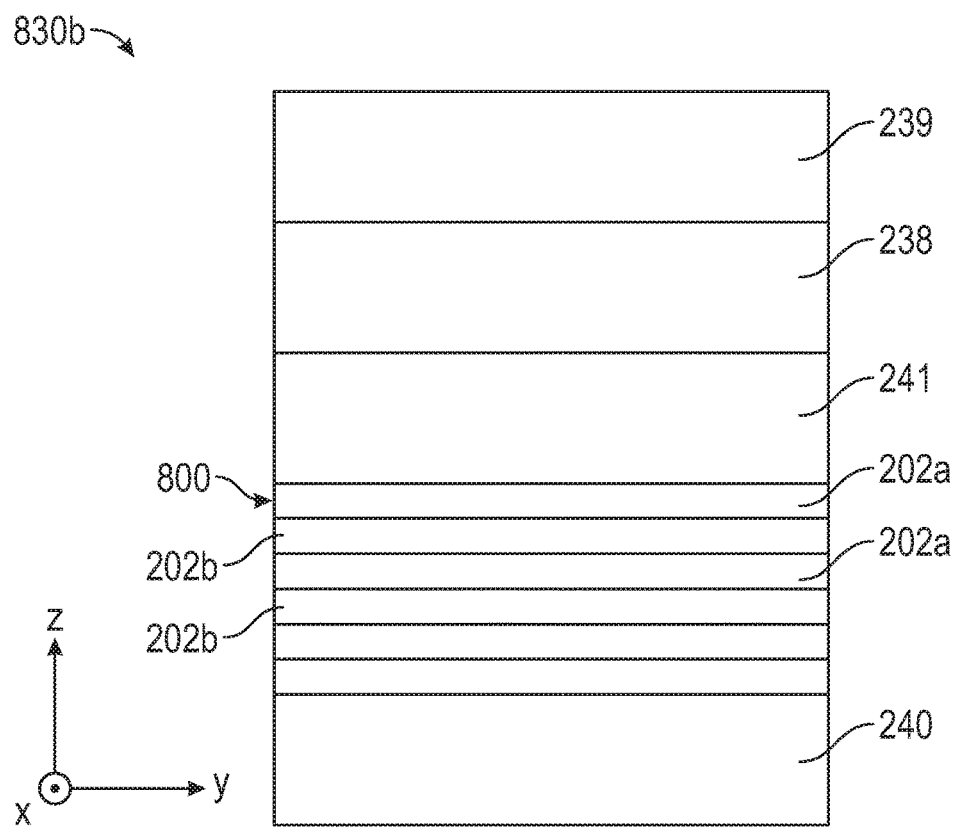

FIGS. 11A-11B are schematic cross-sectional views of optical stacks 830a and 830b where each optical stack includes an optical film 800 that includes alternating polymeric interference layers 202a and 202b and skin layers 241 and 242. Optical stack 830a includes layer or element 238 which may be an optical layer or optical coating (e.g., a Bragg grating), or which may be a mirror film (e.g., an infrared mirror film), or which may be at least one of a heating element or a heat spreading layer.

In some embodiments, element 238 is a mirror film that reflects less than 20% of visible light, and at least 80% of light from 900-1200 nm. Such an infrared mirror film can be used in a windshield to reduce radiative heating of the automobile interior. In some embodiments, when the optical stack 830a is used in an automotive windshield, element 238 is a mirror film disposed on an exterior side of the automotive windshield and the optical film 800 is a reflective polarizer disposed on an interior side of the automotive windshield.

In some embodiments, element 238 is or includes a diffraction grating such as Bragg grating. For example, a waveguide used in a head-up display (HUD) may utilize a grating as described in U.S. Pat. Appl. Publ. Nos. 2015/0160529 (Popovich et al.), 2018/0074340 (Robbins et al.) and 2018/0284440 (Popovich et al.), for example, or in U.S. Pat. No. 9,715,110 (Brown et al.), for example.

In some embodiments, element 238 is at least one of a heating element or a heat spreading layer. Heating element(s) may be used to defog or deice a windshield and heating spreading element(s) may be used to spread heat across a larger area of the windshield in embodiments where the heating element(s) are in a periphery of the windshield, for example. In some embodiments, layer or element 238 is a resistive heating element which may be substantially transmissive to normally incident visible light (e.g., transmitting at least 60% of normally incident light in a wavelength range of 400 nm to 700 nm). In some embodiments, layer or element 238 is a resistive heating element and optical film 800 is a reflective film, and the resistive heating element and reflective film are each substantially transmissive in a predetermined radio frequency range (e.g., in a range from 3 kHz or 30 kHz to 30 GHz or 3 GHz). Windshields with heating elements are known in the art and are described in U.S. Pat. No. 2,526,327 (Carlson), U.S. Pat. No. 5,434,384 (Koontz), U.S. Pat. No. 6,180,921 (Boaz), U.S. Pat. No. 8,921,739 (Petrenko et al.), for example, and in U.S. Pat. Appl. Nos. 2008/0203078 (Huerter) and 2011/0297661 (Raghavan et al.), for example.

Optical stack 830a also includes optional layer 210 which may be an adhesive layer and/or a coating. An additional adhesive or other layer may be disposed on the opposite side (on layer or element 238) of optical stack 830a.

Optical stack 830b includes layer or element 238 and includes layer or element 239. In some embodiments, one of elements 238 and 239 is a heating element and the other one of elements 238 and 239 is a heat spreading layer. In some embodiments, at least one of elements 238 or 239 is a heat spreading layer covering a majority of a total area of a major surface of the optical film 800 which may be a reflective polarizer. An adhesive layer (not illustrated) may be included between 239 and 238 and/or between 238 and 241.

In some embodiments, an optical stack includes at least one of a heating element or a heat spreading layer. In some embodiments, the at least one of the heating element or the heat spreading layer includes one or more resistive elements which may include wires, nanowires (e.g., silver nanowires), or indium tin oxide (ITO), for example. In some embodiments, the at least one of the heating element or the heat spreading layer includes a heat spreading layer which may include nanowires, carbon nanotubes, graphene, or graphite, for example.

FIGS. 12A-12D are schematic plan views of optical stacks including heating element(s) disposed proximate a periphery of a reflective polarizer or other optical film and adapted to heat a heat spreading layer disposed on or within a glass laminate. In some embodiments, the heating elements are disposed directly on the heat spreading layer. Optical stack 930a includes a heating element 939a disposed proximate a bottom edge of the optical stack 930a and includes a heat spreading layer 938a covering a least a majority of a total area of a major surface of the optical film or reflective polarizer of the optical stack 930a. Optical stack 930b includes heating elements 939b disposed proximate bottom and top edges of the optical stack 930b and includes a heat spreading layer 938b covering a least a majority of a total area of a major surface of the optical film or reflective polarizer of the optical stack 930b. Optical stack 930c includes heating elements 939c disposed proximate lateral edges of the optical stack 930c and includes a heat spreading layer 938c covering a least a majority of a total area of a major surface of the optical film or reflective polarizer of the optical stack 930c. Optical stack 930d includes a heating element 939d disposed along an entire periphery of the optical stack 930d and includes a heat spreading layer 938d covering a least a majority of a total, area of a major surface of the optical film or reflective polarizer of the optical stack 930d. In some embodiments, an optical stack includes a resistive heating element (e.g., corresponding to any one of 939a-939d) disposed proximate a periphery of a reflective polarizer and a heat spreading layer (e.g., corresponding to any one of 938a-938d) covering a majority of a total area of a major surface of the reflective polarizer. In some embodiments, the majority of the total area of the major surface is all or substantially all of the total area. The heat spreading layer can be included when heating elements are included only in periphery regions, for example, to spread heat from the periphery regions across the glass laminate. This can be used for defogging or deicing the windshield in automotive applications, for example.

In some embodiments, the heating element is a substantially transparent (e.g., transmits at least 60% of normally incident visible light) resistive heating element. In some embodiments, the heat spreading layer is a substantially transparent heat spreading layer having a thermal conductivity of at least 1.5 W/(m·K) or in any of the ranges described elsewhere herein and/or having a thermal conductivity greater than a largest thermal conductivity of the first and second layers of a plurality of alternating first and second layers of a reflective polarizer. In embodiments where a glass laminate includes a heat spreading layer, the heat spreading layer may have a thermal conductivity higher than that of any other layer in the glass laminate.

Figure 12A:
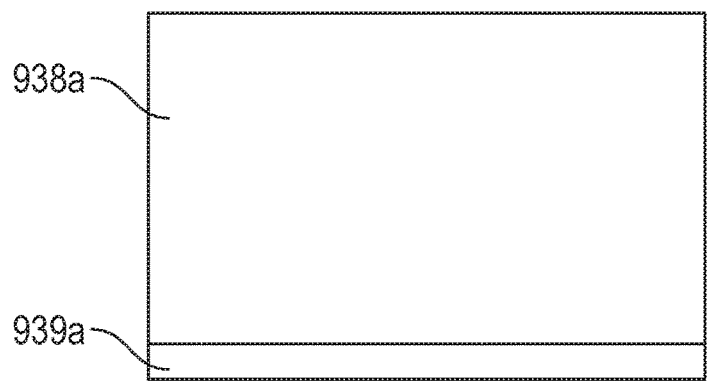
FIGS. 12A-12D are schematic plan views of optical stacks including heating element(s) and a heat spreading layer.
Figure 12B:
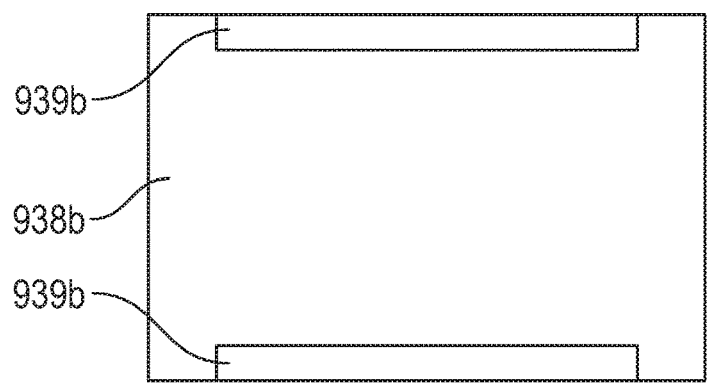
Figure 12C:
Figure 12D:
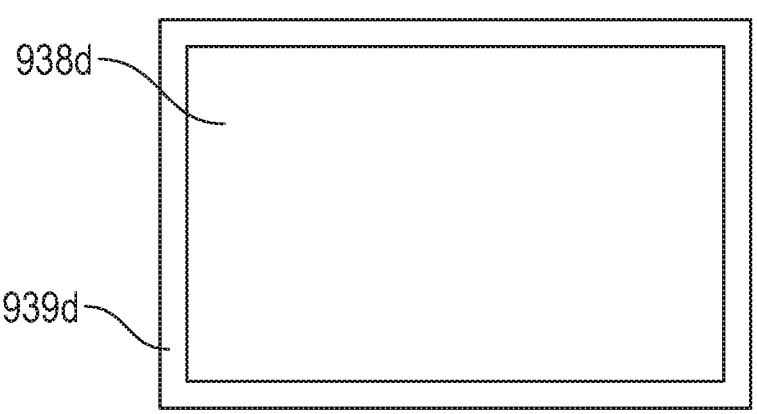
Figure 12E:
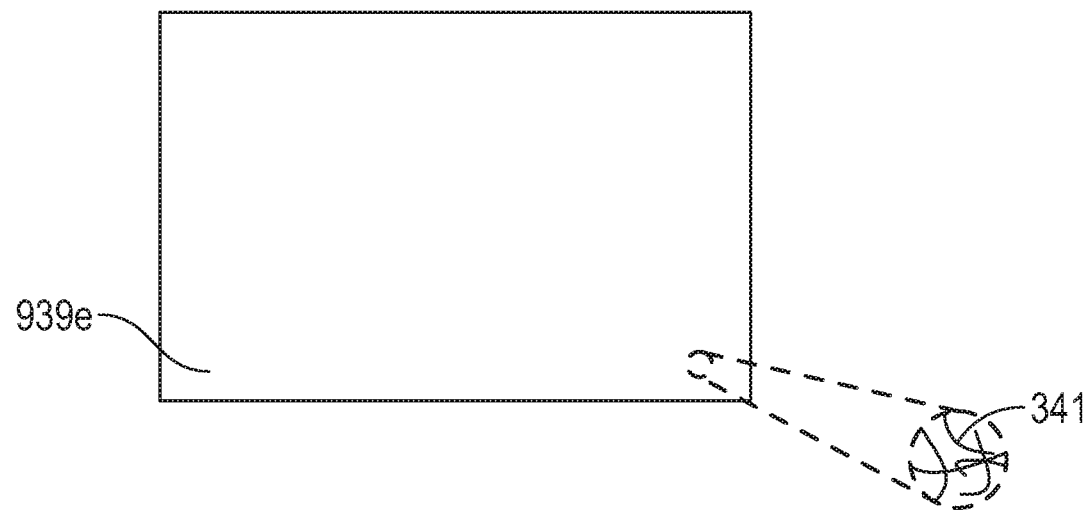
FIG. 12E is a schematic plan view of a layer or element covering at least a majority of a total area of a major surface of a reflective polarizer of an optical stack.

FIG. 12E is a schematic plan view of a layer or element 939e covering at least a majority of a total area of a major surface (e.g., all or substantially all of the total area of the major surface) of the reflective polarizer of an optical stack. In the illustrated embodiment, the element 939e includes a plurality of extended nanoscale (e.g., at least one dimension less than a micrometer) objects 341. In some embodiments, the objects 341 are nanowires. In some embodiments, the nanowires are silver nanowires. Nanowires may be used to provide heating (e.g., element 939e may be a resistive heating element) and/or to provide heat transfer (e.g., element 939e may be a heat spreading element or layer). In some embodiments, the objects 341 are carbon nanotubes. Carbon nanotubes can be used to provide heat transfer, for example. Nanowire-based transparent conductors are described in U.S. Pat. No. 8,094,247 (Allemand et al.) and U.S. Pat. No. 8,748,749 (Srinivas et al.), for example, and in U.S. Pat. Appl. Publ. No. 2018/0014359 (Simonato et al.), for example. Layers including carbon nanotubes are described in U.S. Pat. Appl. Publ. Nos. 2011/0217451 (Veerasamy) and 2015/0275016 (Bao et al.), for example. Other useful materials for a heat spreading element or layer include graphite (e.g., aligned or isotropic) or graphene. The materials (e.g., nanowires and/or carbon nanotubes and/or ITO) for a heat spreading layer or for a resistive heating layer, may be deposited directly or indirectly on the optical film in a glass laminate or may be deposited on an inner surface of a glass layer in a glass laminate, for example. In some embodiments, the thermally and/or electrically conductive material is provided in a binder and in some embodiments the material is deposited as a coating without a binder.

In some embodiments, the heat spreading layer has a thermal conductivity along at least one direction of at least 1.5, 2, 5, 10, 20, 50, 100, 500, or 1000 W/(m·K). The at least one direction preferably includes at least one in-plane direction. For example, when heating elements are disposed at top and bottom edges of a windshield (see, e.g., FIG. 12B) or at horizontal edges (see, e.g., FIG. 12C) it may be desired for the heat spreading layer to have a high thermal conductivity along a vertical direction or a horizontal direction, respectively. The thermal conductivity can be increased along a direction by orienting thermally conductive particles (e.g., carbon nanotubes) along the direction. For example, carbon nanotubes can have an on-axis conductivity of about 1500 W/(m·K) or higher.

Figure 13:
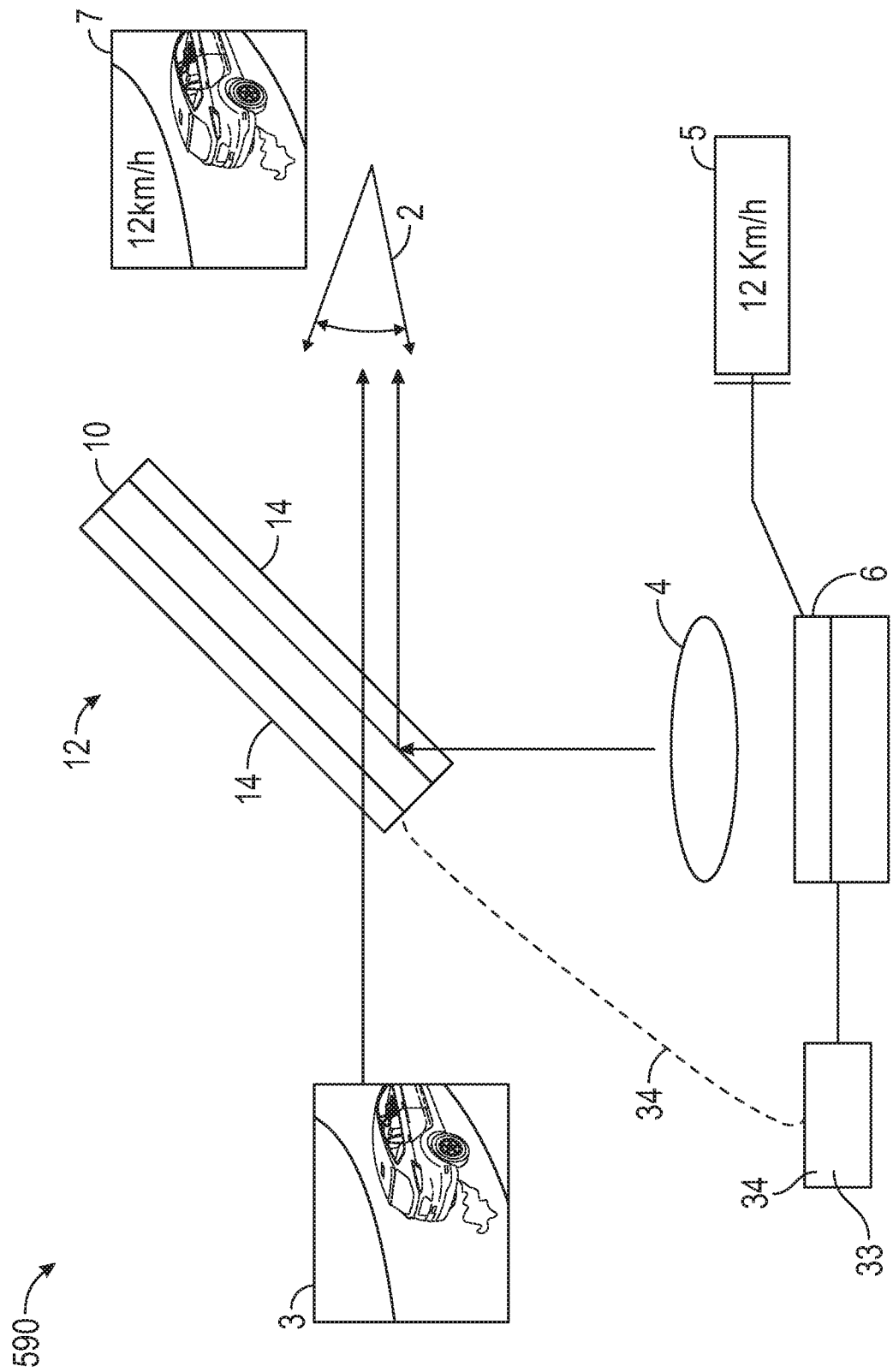
FIG. 13 is a schematic illustration of a display and/or thermal control system.

FIG. 13 is a schematic illustration of a system 590 which may be a display system and/or a thermal control system in an automobile. The system 590 includes a windshield 12 including a glass laminate which includes an optical stack or optical film 10 disposed between glass layers 14. The optical stack or optical film can be any optical stack or optical film of the present description. The optical stack or optical film 10 is preferably disposed in the normal line of sight of the driver (whose eyes 2 are schematically illustrated) when in control of the vehicle. The optical stack or optical film 10 preferably does not substantially impede the driver's view of the vehicle surroundings 3. In the illustrated embodiment, a projector 4 projects an image 5 from a display 6 onto the windshield 12 so that it will be received by the driver's eyes 2 following reflection from the windshield 12. The display image 5 is here illustrated as containing information on the speed of the vehicle. Other display images (e.g., warning indicators, vehicle diagnostics, navigation information) can alternatively or additionally be provided. The driver can perceive the display image 5 as being superimposed on his or her view of the vehicle surroundings 3, as illustrated by the combined image 7.

In some embodiments, the windshield 12 includes heating element(s). For example, optical stack or optical film 10 may include resistive heating element(s) or heating elements may be included at other location(s) on or within the windshield. In some embodiments, the system 590 includes thermal control system 34 which includes a controller 33 configured to provide a voltage to or a current through the heating element(s) in the windshield to heat the windshield. The controller 33 may also be configured to control images displayed by display 6. Alternatively, separate controllers may be used to control the heating element(s) and the display 6. The controller 33 may include one or more central processing unit. Thermal control systems for windshields are known in the art and are described in U.S. Pat. No. 4,730,097 (Campbell et al.), U.S. Pat. No. 4,277,672 (Jones), and U.S. Pat. No. 4,894,513 (Koontz), for example, and in U.S. Pat. Appl. No. 2011/0215078 (Williams), for example.

In some embodiments, system 590 includes a glass laminate including first and second glass layers and an optical stack disposed between the first and second glass layers. The optical stack includes an integrally formed reflective polarizer and at least one of a heating element or a heat spreading layer disposed on the reflective polarizer. The system 590 includes a projector 4 disposed to project a display image 5 onto the glass laminate and a thermal control system 34 adapted to heat the glass laminate by supplying energy to the at least one of the heating element or the heat spreading layer. For example, in some embodiments, the optical stack 10 includes a resistive heating element and the thermal control system 34 is adapted to supply electrical energy to the heating element by applying a voltage to or a current through the resistive heating element. In some embodiments, the optical stack 10 includes a heat spreading layer in thermal contact with a heating element disposed proximate the optical stack. The heating element may be considered to be part of the thermal control system 34 which can supply thermal energy to the heat spreading layer via the heating element by applying a voltage to or a current through the heating element.

The display 6 and projector 4, or the light source 722, may be any suitable type of display/projector. The combination of the display 6 and projector 4 may also be referred to as a projector. In some embodiments, the system 590 includes a thin film transistor (TFT) projector such as those described in U.S. Pat. Appl. Publ. No. 2015/0277172 (Sekine), for example. The TFT projector may be adapted to project p-polarized light onto the glass laminate. In some embodiments, the system 590 includes a projector that includes a polarizing beam splitter (PBS) such as those described in U.S. Pat. Appl. No. 2003/0016334 (Weber et al.), for example. In some embodiments, the system 590 includes a projector including a digital micromirror display (DMD) display such as those described in U.S. Pat. No. 5,592,188 (Doherty et al.), for example. In some embodiments, the system 590 includes a projector including a waveguide display such as those including a Bragg grating as described elsewhere herein. In some embodiments, the light source used in the projector included in system 590 includes one or more at least one laser, or at least one light emitting diode, and/or at least one laser diode. Other used projection systems are described in U.S. Pat. Appl. Publ. Nos. 2005/

0002097 (Boyd et al.), 2005/0270655 (Weber et al.), 2007/0279755 (Hitschmann et al.), and 2012/0243104 (Chen et al.), for example.

The following is a list of illustrative embodiments of the present description.

In a first embodiment, an optical film is provided. The optical film includes: a plurality of alternating first and second layers, the first layers having a first in-plane birefringence being a difference in refractive index of the first layers along a first in-plane direction and a refractive index of the first layers along an orthogonal second in-plane direction, the second layers having a second in-plane birefringence being a difference in refractive indices of the second layers along the first in-plane direction and along the second in-plane direction, the second in-plane birefringence being less than the first in-plane birefringence and greater than 0.03. The optical film has a shrinkage along the first in-plane direction of greater than 4% and a shrinkage along the second in-plane direction of greater than 3% when heated at 150° C. for 15 minutes.

In a second embodiment, an optical film of the first embodiment is provided, where the shrinkage along the first in-plane direction is greater than 5%, or 6%, or 7%, or 8% when heated at 150° C. for 15 minutes.

In a third embodiment, an optical film of the first or second embodiment is provided where the shrinkage along the second in-plane direction is greater than 3.5%, or 4%, or 5%, or 6%, or 7%, or 8% when heated at 150° C. for 15 minutes.

In a fourth embodiment, an optical film of any one of the first to third embodiments is provided, where the first layers include polyethylene terephthalate homopolymer, and the second layers include a first glycol-modified co(polyethylene terephthalate).

In a fifth embodiment, the optical film of any one of the first to fourth embodiments is provided, where a difference Δn1 in refractive index between the first and second layers along the first in-plane direction is at least 0.03, and a difference Δn2 in refractive index between the first and second layers along the second in-plane direction has an absolute value |Δn2| less than Δn1.

In a sixth embodiment, a reflective polarizer is provided. The reflective polarizer includes: a plurality of alternating first and second layers, the first layers including polyethylene terephthalate homopolymer, the second layers including glycol-modified co(polyethylene terephthalate), where the reflective polarizer has a shrinkage along a block axis of the reflective polarizer of greater than 4% and a shrinkage along an orthogonal pass axis of the reflective polarizer of greater than 3% when heated at 150° C. for 15 minutes.

In a seventh embodiment, a reflective polarizer of the sixth embodiment is provided, where the glycol-modified co(polyethylene terephthalate) includes a first glycol-modified co(polyethylene terephthalate) and a different second glycol-modified co(polyethylene terephthalate).

In an eighth embodiment, a reflective polarizer is provided. The reflective polarizer includes: a plurality of alternating first polymer layers and second polymer layers, each layer of the first polymer layers and the second polymer layers having an in-plane birefringence of at least 0.03, the in-plane birefringence being a difference in refractive index of the layer along a first in-plane direction and a refractive index of the layer along an orthogonal second in-plane direction, a difference Δn1 in refractive index between the first polymer layers and the second polymer layers along the first in-plane direction being at least 0.03, a difference Δn2 in refractive index between the first polymer layers and the second polymer layers along the second in-plane direction having an absolute value |Δn2| less than Δn1. The reflective polarizer has a shrinkage along the first in-plane direction of greater than 4% and a shrinkage along the second in-plane direction of greater than 3% when heated at 150° C. for 15 minutes.

In a ninth embodiment, a method of making a glass laminate is provided. The method includes: providing first and second glass layers; disposing a reflective polarizer between the first and second glass layers, the reflective polarizer including a plurality of alternating polymeric interference layers reflecting and transmitting light primarily by optical interference; disposing first and second adhesive layers between the reflective polarizer and the respective first and second glass layers; and laminating the reflective polarizer to the first and second glass layers at a temperature of at least 120° C. and a pressure of at least 0.9 MPa to provide the glass laminate. Prior to the laminating step, the reflective polarizer has a shrinkage along a block axis of the reflective polarizer of greater than 4% and a shrinkage along an orthogonal pass axis of the reflective polarizer of greater than 3% when heated at 150° C. for 15 minutes.

In a tenth embodiment, the method of the ninth embodiment is provided, where prior to the lamination step, the reflective polarizer is an optical film according to any one of the first to fifth embodiments or a reflective polarizer according to any one of the sixth to eight embodiments.

In an eleventh embodiment, the method of the ninth or tenth embodiment is provided, where after the lamination step, the reflective polarizer has a tensile stress of at least 0.5 MPa along the block axis and a tensile stress of at least 0.5 MPa along the pass axis.

In a twelfth embodiment, the method of the eleventh embodiment is provided, where after the lamination step, the tensile stress along the block axis is at least 1 MPa, or at least 2 MPa, or at least 3 MPa.

In a thirteenth embodiment, the method of the eleventh or twelfth embodiment is provided, where after the lamination step, the tensile stress along the pass axis is at least 1 MPa, or at least 2 MPa, or at least 3 MPa, or at least 5 MPa, or at least 7 MPa, or at least 9 MPa, or at least 10 MPa, or at least 11 MPa, or at least 11.5 MPa.

In a fourteenth embodiment, a glass laminate including a first glass layer and a reflective polarizer laminated to the first layer is provided. The reflective polarizer includes a plurality alternating polymeric interference layers reflecting and transmitting light primarily by optical interference and defining a block axis and an orthogonal pass axis. The reflective polarizer has a tensile stress of at least 0.5 MPa along the block axis and a tensile stress of at least 0.5 MPa along the pass axis.

In a fifteenth embodiment, a glass laminate is provided. The glass laminate includes first and second glass layers and a reflective film including a plurality of alternating polymeric interference layers and disposed substantially symmetrically between and bonded to the first and second glass layers such that when a plurality of parallel straight lines is projected onto the glass laminate along a first direction making an angle θ in a range of 40 degrees to 75 degrees with respect to a normal to the glass laminate so that the plurality of parallel straight lines extend along a second direction orthogonal to a plane of incidence defined by the first direction and the normal, each projected straight line reflects from the reflective film as a reflected line, each reflected line having a luminance distribution defining a centerline of the reflected line, a distribution of an angle α between the centerlines of the reflected lines and the second direction having a standard deviation of less than 2.5 degrees.

In a sixteenth embodiment, a glass laminate is provided. The glass laminate includes first and second glass layers and a reflective film including a plurality of alternating polymeric interference layers and disposed between and bonded to the first and second glass layers such that when a plurality of parallel straight lines is projected from a display surface onto the glass laminate along a first direction, each straight line having a substantially same line width on the display surface, the first direction making an angle θ in a range of 40 degrees to 75 degrees with respect to a normal to the glass laminate, the plurality of parallel straight lines extending along a second direction orthogonal to a plane of incidence defined by the first direction and the normal, each projected straight line reflects from the reflective film as a reflected line such that an image of the reflected line has a luminance distribution in an image plane, a magnification from the display surface to the image plane being about 1, the luminance distribution of the image of each reflected line having a standard deviation about a best fit straight line, a mean of the standard deviations being less than 0.9 times the line width.

In a seventeenth embodiment, a glass laminate of the fifteenth or sixteenth embodiment is provided, where the reflective film includes a reflective polarizer having a block axis and an orthogonal pass axis, the reflective polarizer having a tensile stress of at least 0.5 MPa along the block axis and a tensile stress of at least 0.5 MPa along the pass axis.

In an eighteenth embodiment, a system including the glass laminate of any one of the fourteenth to seventeenth embodiments and a projector disposed to project a display image onto the glass laminate is provided. The glass laminate further includes at least one of a resistive heating element or a heat spreading layer, and the system is adapted to heat the glass laminate by supplying energy to the at least one of the heating element or the heat spreading layer.

In a nineteenth embodiment, a system including a glass laminate and a projector disposed to project a display image onto the glass laminate is provided. The glass laminate includes first and second glass layers and an optical stack disposed between the first and second glass layers and including a reflective polarizer and at least one of a heating element or a heat spreading layer disposed on the reflective polarizer. The system further includes a thermal control system adapted to heat the glass laminate by supplying energy to the at least one of the heating element or the heat spreading layer. The glass laminate may be a glass laminate according to any one of the fourteenth to seventeenth embodiments. The glass laminate may be made according to any one of the ninth to thirteenth embodiments.

In a twentieth embodiment, an optical stack including a reflective polarizer and at least one of a substantially transparent resistive heating element or a substantially transparent heat spreading layer having a thermal conductivity of at least 1.5 W/(m·K) disposed on the reflective polarizer is provided. The reflective polarizer may be an optical film according to any one of the first to fifth embodiments or a reflective polarizer according to any one of the sixth to eight embodiments.

In a twenty-first embodiment, an optical stack including a reflective polarizer and a substantially transparent heat spreading layer disposed on the reflective polarizer is provided. The reflective polarizer includes a plurality of alternating first and second layers and the heat spreading layer has a thermal conductivity greater than a largest thermal conductivity of the first and second layers. The reflective polarizer may be an optical film according to any one of the first to fifth embodiments or a reflective polarizer according to any one of the sixth to eight embodiments.

EXAMPLES

Examples 1-6 and Comparative Examples C1-C5

Birefringent reflective polarizers were prepared as follows. Two polymers were used for the optical layers. The first polymer (first optical layers) was purified terephthalic acid (PTA) based polyethylene terephthalate with an intrinsic viscosity of 0.72. The second polymer (second optical layers) was polyethylene terephthalate glycol (PETG) GN071 from Eastman Chemical Company (Kingsport, TN). The ratio of the feed rate of the first polymer to the second polymer was chosen to make the optical layers have a f-ratio as indicated in Table 1. The polymer used for the skin layers was purified terephthalic acid (PTA) based polyethylene terephthalate with an intrinsic viscosity of 0.72. The materials were fed from separate extruders to a multilayer coextrusion feedblock, in which they were assembled into a packet of 275 alternating optical layers, plus a thicker protective boundary layer of the first optical layers, on each side, for a total of 277 layers. The skin layers of the second optical layer material were added to both sides of the construction in a manifold specific to that purpose, resulting in a final construction having 279 layers. The multilayer melt was then cast through a film die onto a chill roll, in the conventional manner for polyester films, upon which it was quenched. The cast web was then stretched in a commercial scale linear tenter at a draw ratio of approximately 6:1 with the temperature of the stretching section as indicated in Table 1. Table 1 also provides the temperature of the heat set section, the tenter frame toe-in, and the resulting physical thickness of the film as measured by a capacitance gauge.

TABLE 1

| Example | Stretch temp (° F.) | Heat set temp (° F.) | Toe-in (%) | F-ratio | Thickness (μm) |
| --- | --- | --- | --- | --- | --- |
| C1 | 226 | 369 | 4.3% | 0.59 | 75.4 |
| C2 | 224 | 350 | 6.3% | 0.55 | 76.6 |
| C3 | 224 | 350 | 5.1% | 0.55 | 77.5 |
| C4 | 224 | 337 | 8.9% | 0.48 | 79.2 |
| C5 | 224 | 337 | 8.9% | 0.48 | 78.6 |
| 1 | 225 | 325 | 4.3% | 0.55 | 77.7 |
| 2 | 225 | 325 | 4.3% | 0.55 | 77.7 |
| 3 | 224 | 300 | 4.3% | 0.55 | 77.6 |
| 4 | 224 | 300 | 4.3% | 0.55 | 77.6 |
| 5 | 224 | 275 | 4.3% | 0.55 | 77.5 |
| 6 | 224 | 250 | 4.0% | 0.55 | 78.5 |

The percent shrinkage of the films when heated at 150° C. for 15 minutes was determined along the machine direction (MD) and the transverse direction (TD) and are reported in Table 2.

A glass laminate was prepared for a sample of each film by laminating the film between 2.1 mm thick glass layers using 0.38 mm thick PVB adhesive layers. The laminate was prepared using an autoclave which ramped the temperature up to 285° F. and the pressure up to 170 psi and held this temperature and pressure for 30 minutes before ramping the temperature and pressure back down toward ambient temperature and pressure.

A nonuniformity value for the laminate was obtained by reflecting a cone of p-pol light from the laminate having an angle of incidence of about 60 degrees onto a screen, imaging the screen, filtering the image through a low pass Fourier filter to remove spatial frequencies corresponding to lengths substantially below 1 cm, dividing the filtered image into a two-dimensional grid of rectangular grid cells, determining an interquartile range of brightness in the grid cell, determining a nonuniformity rating as an average of the interquartile range, determining a nonuniformity value from the nonuniformity rating using an established correlation of nonuniformity ratings with human ratings. The correlation of nonuniformity ratings with human ratings was established using glass laminates including reflective polarizer films having a range of uniformity. The method of determining the nonuniformity value is generally described in U.S. Prov. Appl. No. 62/767,407 filed Nov. 13, 2018 and titled "Method and System for Characterizing Surface Uniformity". A nonuniformity value of less than about 2 is considered good and a nonuniformity value greater than about 3 is considered poor. The nonuniformity values are reported in Table 2.

Other quantities characterizing the uniformity were determined for some of the samples as follows. A plurality of parallel straight lines was projected onto the glass laminate along a first direction making an angle θ of about 60 degrees with respect to a normal to the glass laminate so that the plurality of parallel straight lines extended along a second direction orthogonal to a plane of incidence defined by the first direction and the normal (see, e.g., FIG. 9A). A centerline for each reflected line was determined from a luminance distribution determined from an image of the reflected line taken in a camera. The standard deviation the angle α between the centerlines of the reflected lines and the second direction was determined and is reported in Table 2. The straight lines were projected from a display surface were the lines had a width of 1 pixel and a magnification from the display surface to the image plane in the camera was about 1. A standard deviation of the luminance distribution of the image of each reflected line about a best fit straight line was determined and a mean of the standard deviations was determined and is reported in Table 2.

TABLE 2

| Example | % Shrinkage MD | % Shrinkage TD | Glass laminate size | Nonuniformity value | Standard deviation of reflected centerline angle (deg) | Mean of standard deviation of reflected line width |
|---|---|---|---|---|---|---|
| C1 | 2.1 | 2.2 | 6 in × 6 in (15 cm × 15 cm) | 3.7 | 2.6 | 0.99 |
| C2 | 3 | 3 | 6 in × 6 in (15 cm × 15 cm) | 2.24 | | |
| C3 | 3 | 4 | 6 in × 6 in (15 cm × 15 cm) | 2.47 | | |
| C4 | 4 | 2.5 | 6 in × 6 in (15 cm × 15 cm) | 3.27 | | |
| C5 | 4 | 3 | 6 in × 6 in (15 cm × 15 cm) | 3.19 | | |
| 1 | 6.0 | 7.8 | 6 in × 6 in (15 cm × 15 cm) | 1.7 | 1.7 | 0.73 |
| 2 | 6.0 | 7.8 | 12 in × 12 in (30 cm × 30 cm) | 1.26 | | |
| 3 | 8.8 | 8.5 | 6 in × 6 in (15 cm × 15 cm) | 1.3 | 1.6 | 0.67 |
| 4 | 8.8 | 8.5 | 12 in × 12 in (30 cm × 30 cm) | 1.1 | | |
| 5 | 9 | 10 | 6 in × 6 in (15 cm × 15 cm) | 1.39 | | |
| 6 | 10 | 12 | 12 in × 12 in (30 cm × 30 cm) | 0.996 | | |

Figure 14A:
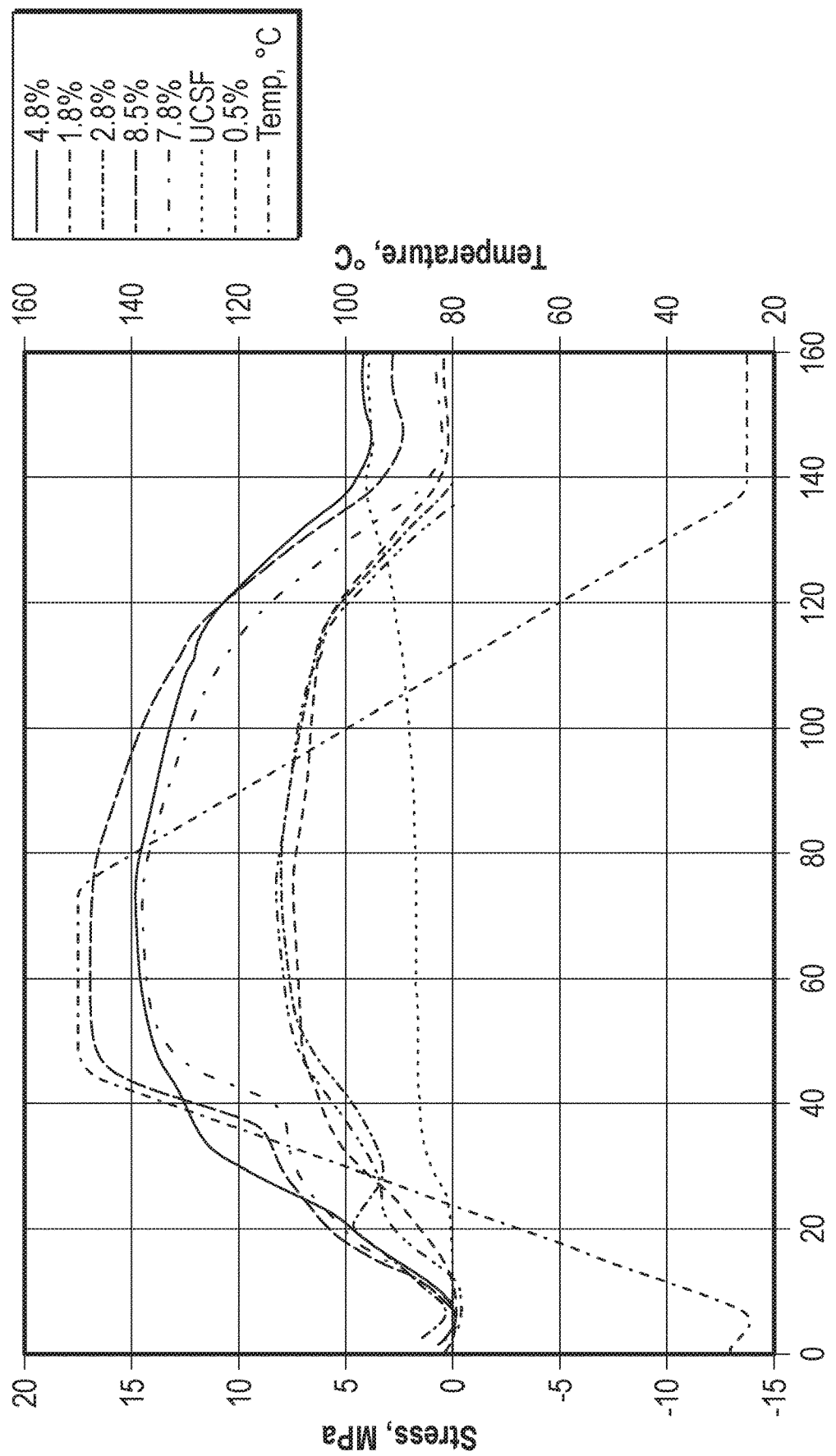
FIGS. 14A-14B are plots of tensile stress versus time for optical films along transverse and machine directions, respectively.
Figure 14B:
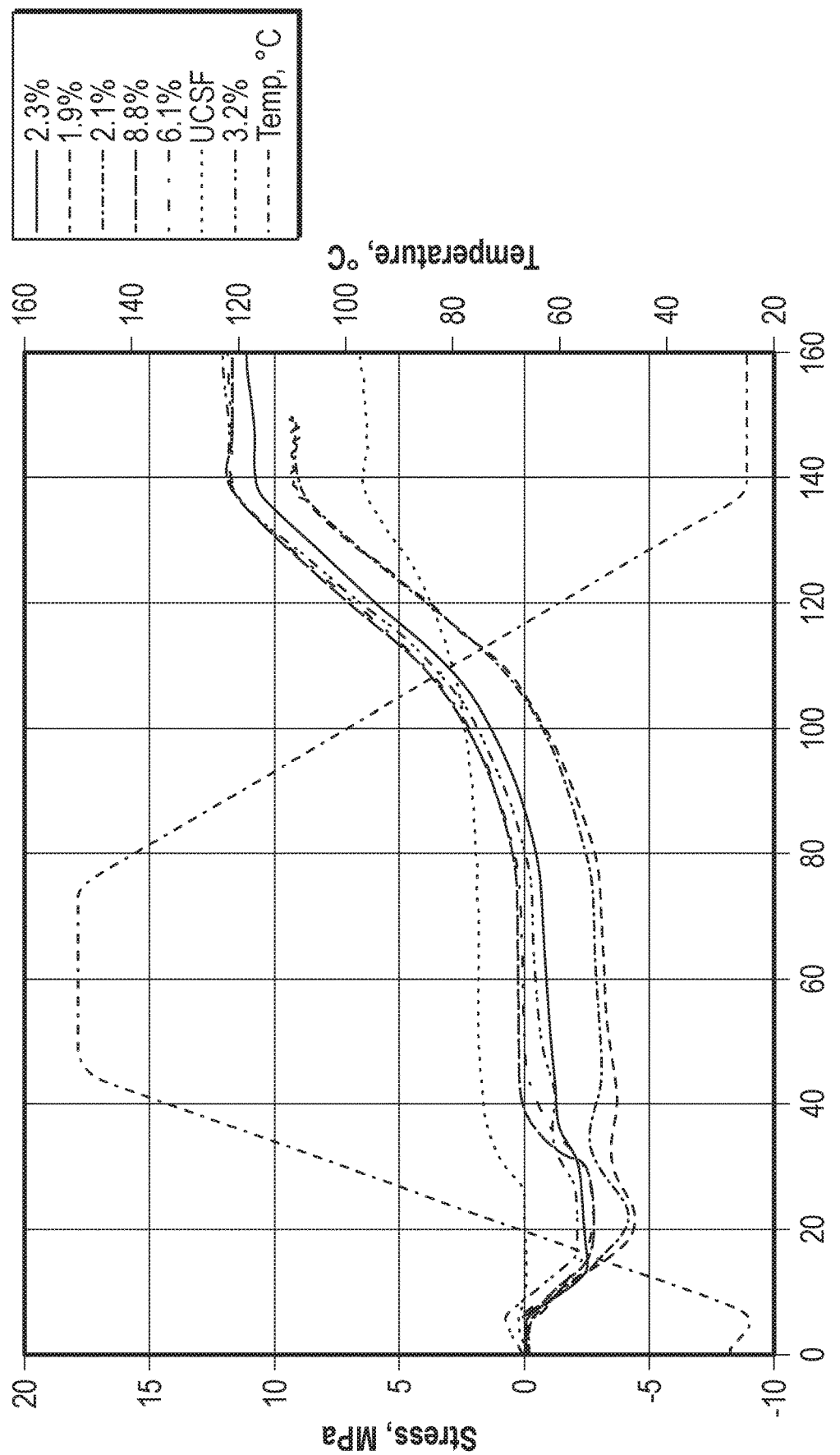

Various film samples were heated according to the temperature profiles shown in FIGS. 14A-14B and the stresses along the transverse direction (block axis) and along the machine direction (pass axis) were measured using dynamic mechanical analysis (DMA) and are shown in FIGS. 14A and 14B, respectively. The curves are labeled according to the approximate percent shrinkage of the film in the TD direction (FIG. 14A) and the MD direction (FIG. 14B). The same indicator line styles are used for the same films in FIGS. 14A and 14B. The UCSF film in these figures is 3M Ultra-Clear Solar Film available from 3M Company, St. Paul, MN.

Figure 15:
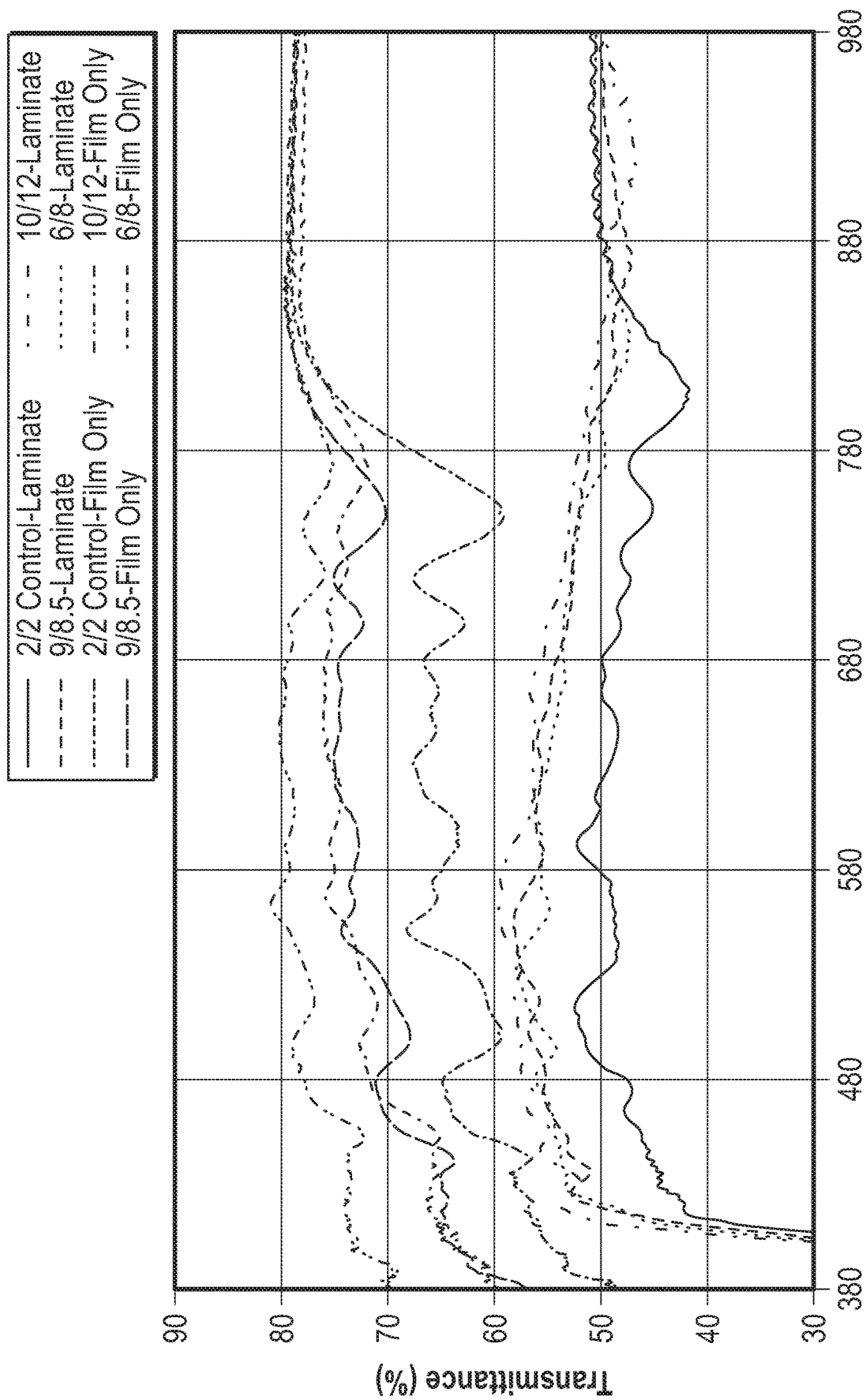
FIG. 15 is a plot of transmittance for s-pol block state light at an angle of incidence of 60 degrees for reflective polarizers and glass laminates.

Transmittance of optical films of Examples 1, 3, 6 and Comparative Example C1 and glass laminates including the optical films are shown in FIG. 15 for p-pol block state light at an angle of incidence of 60 degrees. The curves are labeled according to the approximate percent shrinkage in the MD/TD directions. The average transmittance over the wavelength range of 430 nm to 650 nm is reported in Table 3.

TABLE 3

| | Avg % T 430-650 nm | |
|---|---|---|
| Example | Film Only | Laminate |
| C1 | 63.5 | 49.2 |
| 6 | 78 | 57.2 |
| 3 | 71.3 | 55.8 |
| 1 | 72.4 | 55.5 |

Terms such as "about" will be understood in the context in which they are used and described in the present description by one of ordinary skill in the art. If the use of "about"

as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical film comprising:
a plurality of alternating first and second layers, the first layers having a first in-plane birefringence being a difference in refractive index of the first layers along a first in-plane direction and a refractive index of the first layers along an orthogonal second in-plane direction, the second layers having a second in-plane birefringence being a difference in refractive indices of the second layers along the first in-plane direction and along the second in-plane direction, the second in-plane birefringence being less than the first in-plane birefringence and greater than 0.03, wherein the optical film has a shrinkage along the first in-plane direction of greater than 4% and a shrinkage along the second in-plane direction of greater than 3% when heated at 150° C. for 15 minutes.

2. The optical film of claim 1, wherein the shrinkage along the first in-plane direction is greater than 6% when heated at 150° C. for 15 minutes.

3. The optical film of claim 1, wherein the shrinkage along the second in-plane direction is greater than 5% when heated at 150° C. for 15 minutes.

4. The optical film of claim 1, wherein the first layers comprise polyethylene terephthalate homopolymer, and the second layers comprise a first glycol-modified co(polyethylene terephthalate).

5. The optical film of claim 4, wherein the second layers further comprise a second glycol-modified co(polyethylene terephthalate) different from the first glycol-modified co(polyethylene terephthalate).

6. The optical film of claim 1, wherein a difference $\Delta n1$ in refractive index between the first and second layers along the first in-plane direction is at least 0.03, and a difference $\Delta n2$ in refractive index between the first and second layers along the second in-plane direction has an absolute value $|\Delta n2|$ less than $\Delta n1$.

7. An optical stack comprising a reflective polarizer and at least one of a substantially transparent resistive heating element or a substantially transparent heat spreading layer having a thermal conductivity of at least 1.5 W/(m·K) disposed on the reflective polarizer, wherein the reflective polarizer is an optical film according to claim 1.

* * * * *